(12) United States Patent
Cortelyou et al.

(10) Patent No.: US 10,025,990 B2
(45) Date of Patent: Jul. 17, 2018

(54) SYSTEM AND METHOD FOR TRACKING VEHICLES IN PARKING STRUCTURES AND INTERSECTIONS

(71) Applicant: Universal City Studios LLC, Universal City, CA (US)

(72) Inventors: Robert J. Cortelyou, Orlando, FL (US); Christopher Oliver, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 317 days.

(21) Appl. No.: 14/717,893

(22) Filed: May 20, 2015

(65) Prior Publication Data

US 2015/0339920 A1 Nov. 26, 2015

Related U.S. Application Data

(60) Provisional application No. 62/001,551, filed on May 21, 2014.

(51) Int. Cl.

| | | |
|---|---|---|
| *G08G 1/095* | (2006.01) | |
| *G06K 9/00* | (2006.01) | |
| *G08G 1/01* | (2006.01) | |
| *G06K 9/32* | (2006.01) | |
| *G08G 1/08* | (2006.01) | |
| *G08G 1/14* | (2006.01) | |

(52) U.S. Cl.
CPC ....... *G06K 9/00771* (2013.01); *G06K 9/3216* (2013.01); *G08G 1/01* (2013.01); *G08G 1/08* (2013.01); *G08G 1/142* (2013.01)

(58) Field of Classification Search
CPC .................................. G06F 1/00; H04W 4/00
See application file for complete search history.

(56) References Cited

U.S. PATENT DOCUMENTS

| | | |
|---|---|---|
| 2,170,160 A | 8/1939 | Bailey |
| 3,740,562 A | 6/1973 | Fertig |
| 3,743,217 A | 7/1973 | Turck |
| 4,254,433 A | 3/1981 | Dewar, Jr. et al. |
| 4,662,756 A | 5/1987 | Duran, Jr. |

(Continued)

FOREIGN PATENT DOCUMENTS

| | | |
|---|---|---|
| CN | 201189396 | 2/2009 |
| CN | 203366542 | 12/2013 |

(Continued)

OTHER PUBLICATIONS

Ouchi et al., "Magic Wand: An Intuitive Gesture Remote Control for Home Appliances," May 2005.

(Continued)

*Primary Examiner* — Shirley Lu
(74) *Attorney, Agent, or Firm* — Fletcher Yoder, P.C.

(57) ABSTRACT

A dynamic signal to noise ratio tracking system enables detection of vehicles within the field of view of the tracking system. The tracking system may include an emitter configured to emit electromagnetic radiation within an area, a detector configured to detect electromagnetic radiation reflected back from vehicles within the area, and a control unit configured to evaluate signals from the detector and control various automated devices as a result of this evaluation.

7 Claims, 17 Drawing Sheets

(56) References Cited

U.S. PATENT DOCUMENTS

| | | |
|---|---|---|
| 4,855,915 A | 8/1989 | Dallaire |
| 5,210,604 A | 5/1993 | Carpenter |
| 5,365,266 A | 11/1994 | Carpenter |
| 5,432,508 A * | 7/1995 | Jackson .................... E04H 6/42 340/932.2 |
| 5,682,331 A | 10/1997 | Berlin |
| 5,809,161 A | 9/1998 | Auty et al. |
| 6,008,800 A | 12/1999 | Pryor |
| 6,176,837 B1 | 1/2001 | Foxlin |
| 6,342,706 B1 | 1/2002 | Takeda |
| 6,474,159 B1 | 11/2002 | Foxlin et al. |
| 6,665,079 B1 | 12/2003 | Tocci et al. |
| 6,711,280 B2 | 3/2004 | Stafsudd |
| 6,720,949 B1 | 4/2004 | Pryor et al. |
| 6,761,637 B2 | 7/2004 | Weston et al. |
| 6,784,826 B2 | 8/2004 | Kane et al. |
| 6,831,603 B2 | 12/2004 | Menache |
| 6,950,021 B2 | 9/2005 | Butler |
| 6,967,566 B2 | 11/2005 | Weston et al. |
| 7,084,859 B1 | 8/2006 | Pryor |
| 7,089,148 B1 | 8/2006 | Bachmann et al. |
| 7,098,891 B1 | 8/2006 | Pryor |
| 7,184,022 B2 | 2/2007 | Xie et al. |
| 7,257,237 B1 | 8/2007 | Luck et al. |
| 7,259,747 B2 | 8/2007 | Bell |
| 7,307,617 B2 | 12/2007 | Wilson et al. |
| 7,356,172 B2 | 4/2008 | Fan et al. |
| 7,395,181 B2 | 7/2008 | Foxlin |
| 7,401,783 B2 | 7/2008 | Pryor |
| 7,445,550 B2 | 11/2008 | Barney et al. |
| 7,466,843 B2 | 12/2008 | Pryor |
| 7,489,303 B1 | 2/2009 | Pryor |
| 7,500,917 B2 | 3/2009 | Barney et al. |
| 7,502,126 B2 | 3/2009 | Ong |
| 7,505,033 B2 | 3/2009 | Guo et al. |
| 7,519,537 B2 | 4/2009 | Rosenberg |
| 7,618,323 B2 | 11/2009 | Rothschild et al. |
| 7,623,115 B2 | 11/2009 | Marks |
| 7,671,851 B1 | 3/2010 | Pryor |
| 7,704,135 B2 | 4/2010 | Harrison, Jr. |
| 7,755,608 B2 | 7/2010 | Chang et al. |
| 7,775,439 B2 | 8/2010 | Kimber et al. |
| 7,843,429 B2 | 11/2010 | Pryor |
| 7,850,527 B2 | 12/2010 | Barney et al. |
| 7,854,655 B2 | 12/2010 | Mao et al. |
| 7,863,551 B2 | 1/2011 | Bang et al. |
| 7,874,918 B2 | 1/2011 | Osnato et al. |
| 7,896,742 B2 | 3/2011 | Weston et al. |
| 7,905,769 B1 | 3/2011 | Harrison, Jr. |
| 7,918,733 B2 | 4/2011 | Zalewski et al. |
| 7,927,216 B2 | 4/2011 | Ikeda et al. |
| 7,996,793 B2 | 8/2011 | Latta et al. |
| 8,040,328 B2 | 10/2011 | Smith et al. |
| 8,058,975 B2 | 11/2011 | Barnardo et al. |
| 8,209,134 B2 | 6/2012 | Parker et al. |
| 8,228,305 B2 | 7/2012 | Pryor |
| 8,248,367 B1 | 8/2012 | Barney et al. |
| 8,287,374 B2 | 10/2012 | Pryor |
| 8,306,635 B2 | 11/2012 | Pryor |
| 8,538,562 B2 | 9/2013 | Pryor et al. |
| 8,553,079 B2 | 10/2013 | Pryor |
| 9,316,593 B2 | 4/2016 | Switkes |
| 9,513,606 B1 | 12/2016 | Larsen |
| 9,649,551 B2 | 5/2017 | Maharbiz |
| 2003/0048926 A1 | 3/2003 | Watanabe |
| 2003/0069077 A1 | 4/2003 | Koreienek et al. |
| 2004/0102247 A1 | 5/2004 | Smoot et al. |
| 2004/0166937 A1 | 8/2004 | Kopera et al. |
| 2004/0178955 A1 | 9/2004 | Menache et al. |
| 2005/0128578 A1 | 6/2005 | Sugawara |
| 2005/0143173 A1 | 6/2005 | Barney et al. |
| 2006/0030385 A1 | 2/2006 | Barney et al. |
| 2006/0033641 A1 | 2/2006 | Jaupitre et al. |
| 2006/0125691 A1 | 6/2006 | Menache et al. |
| 2006/0154726 A1 | 7/2006 | Weston et al. |
| 2006/0256081 A1 | 11/2006 | Zalewski et al. |
| 2006/0282873 A1 | 12/2006 | Zalewski et al. |
| 2006/0287087 A1 | 12/2006 | Zalewski et al. |
| 2007/0259594 A1 | 11/2007 | Galbiati et al. |
| 2007/0265075 A1 | 11/2007 | Zalewski |
| 2008/0013826 A1 | 1/2008 | Hillis et al. |
| 2008/0014835 A1 | 1/2008 | Weston et al. |
| 2008/0074652 A1 | 3/2008 | Fouquet |
| 2008/0096654 A1 | 4/2008 | Mondesir et al. |
| 2008/0125896 A1 | 5/2008 | Troy et al. |
| 2008/0158555 A1 | 7/2008 | Mori |
| 2008/0244468 A1 | 10/2008 | Nishihara et al. |
| 2009/0051653 A1 | 2/2009 | Barney et al. |
| 2009/0066784 A1 | 3/2009 | Stone et al. |
| 2009/0115721 A1 | 5/2009 | Aull et al. |
| 2009/0121894 A1 | 5/2009 | Wilson et al. |
| 2009/0124165 A1 | 5/2009 | Weston |
| 2009/0191968 A1 | 7/2009 | Johnson et al. |
| 2009/0215534 A1 | 8/2009 | Wilson et al. |
| 2009/0222149 A1 | 9/2009 | Murray et al. |
| 2009/0278915 A1 | 11/2009 | Kramer et al. |
| 2009/0303069 A1 | 12/2009 | Carl, Jr. |
| 2009/0316952 A1 | 12/2009 | Ferren et al. |
| 2010/0040292 A1 | 2/2010 | Clarkson |
| 2010/0050133 A1 | 2/2010 | Nishihara et al. |
| 2010/0133424 A1 | 6/2010 | Lindsay |
| 2010/0134308 A1 | 6/2010 | Barnardo et al. |
| 2010/0292007 A1 | 7/2010 | Tarra et al. |
| 2010/0194762 A1 | 8/2010 | Latta et al. |
| 2010/0199228 A1 | 8/2010 | Latta et al. |
| 2010/0199230 A1 | 8/2010 | Latta et al. |
| 2010/0208129 A1 | 8/2010 | Rindfuss et al. |
| 2010/0215215 A1 | 8/2010 | Ueshima |
| 2010/0281436 A1 | 11/2010 | Kipman et al. |
| 2010/0304868 A1 | 12/2010 | Zalewski |
| 2010/0306712 A1 | 12/2010 | Snook et al. |
| 2010/0306714 A1 | 12/2010 | Latta et al. |
| 2010/0306715 A1 | 12/2010 | Geisner et al. |
| 2010/0306716 A1 | 12/2010 | Perez |
| 2011/0081970 A1 | 4/2011 | Barney et al. |
| 2011/0118021 A1 | 5/2011 | Zalewski |
| 2011/0151974 A1 | 6/2011 | Deaguero |
| 2011/0174189 A1 | 7/2011 | Beutler |
| 2011/0183751 A1 | 7/2011 | Ueshima |
| 2011/0301757 A1 | 12/2011 | Jones |
| 2012/0218107 A1 | 8/2012 | Mimeault |
| 2012/0262366 A1 | 10/2012 | Zhu et al. |
| 2013/0177296 A1 | 7/2013 | Geisner et al. |
| 2013/0188839 A1 | 7/2013 | Abraham et al. |
| 2013/0300637 A1 | 11/2013 | Smits |
| 2013/0320236 A1 | 12/2013 | Ohta |
| 2013/0342813 A1 | 12/2013 | Wang |
| 2014/0028475 A1 | 1/2014 | Lee |
| 2014/0036076 A1 | 2/2014 | Nerayoff et al. |
| 2014/0166854 A1 | 6/2014 | Kowalevicz |
| 2014/0240102 A1 | 8/2014 | Kawash et al. |
| 2014/0314278 A1 | 10/2014 | Tatsuzawa et al. |
| 2015/0234385 A1* | 8/2015 | Sandin .................. G05D 1/0265 700/258 |

FOREIGN PATENT DOCUMENTS

| | | |
|---|---|---|
| EP | 1578130 | 9/2005 |
| JP | 2012120648 | 6/2012 |
| JP | 2013175221 A | 9/2013 |

OTHER PUBLICATIONS

3M, "Retroreflection," Personal Safety Products, 3M Occupational health and Environmental Safety Division; St. Paul, Minnesota, 2005, www.3M.com/Scotchlite.

Chen, X.; "Capturing Fast Motion with Consumer Grade Unsynchronized Rolling-Shutter Cameras"; The University of British Columbia 2012, pp. 1-85.

Chung, J. et al.; "Vision Based Motion Tracking System for Interactive Entertainment Applications"; ETRI 2005, pp. 1-6.

(56) References Cited

OTHER PUBLICATIONS

Hargather, M. et al.; "Retroreflective Shadowgraph Technique for Large-Scale Flow Visualization"; Applied Optics vol. 48(22) 2009, pp. 4449-4457.
Sparacino, F. et al.; "Media in Performance: interactive Spaces for Dance, Theater, Circus, and Museum Exhibts"; IBM Systems Journal vol. 39 (3&4) 2000, pp. 479-510.
PCT/US2015/032035 International Search Report and Written Opinion dated Sep. 8, 2015.
International Search Report and Written Opinion of Singapore Patent Application No. 11201609328T, dated Oct. 7, 2017 and Sep. 28, 2017.

* cited by examiner

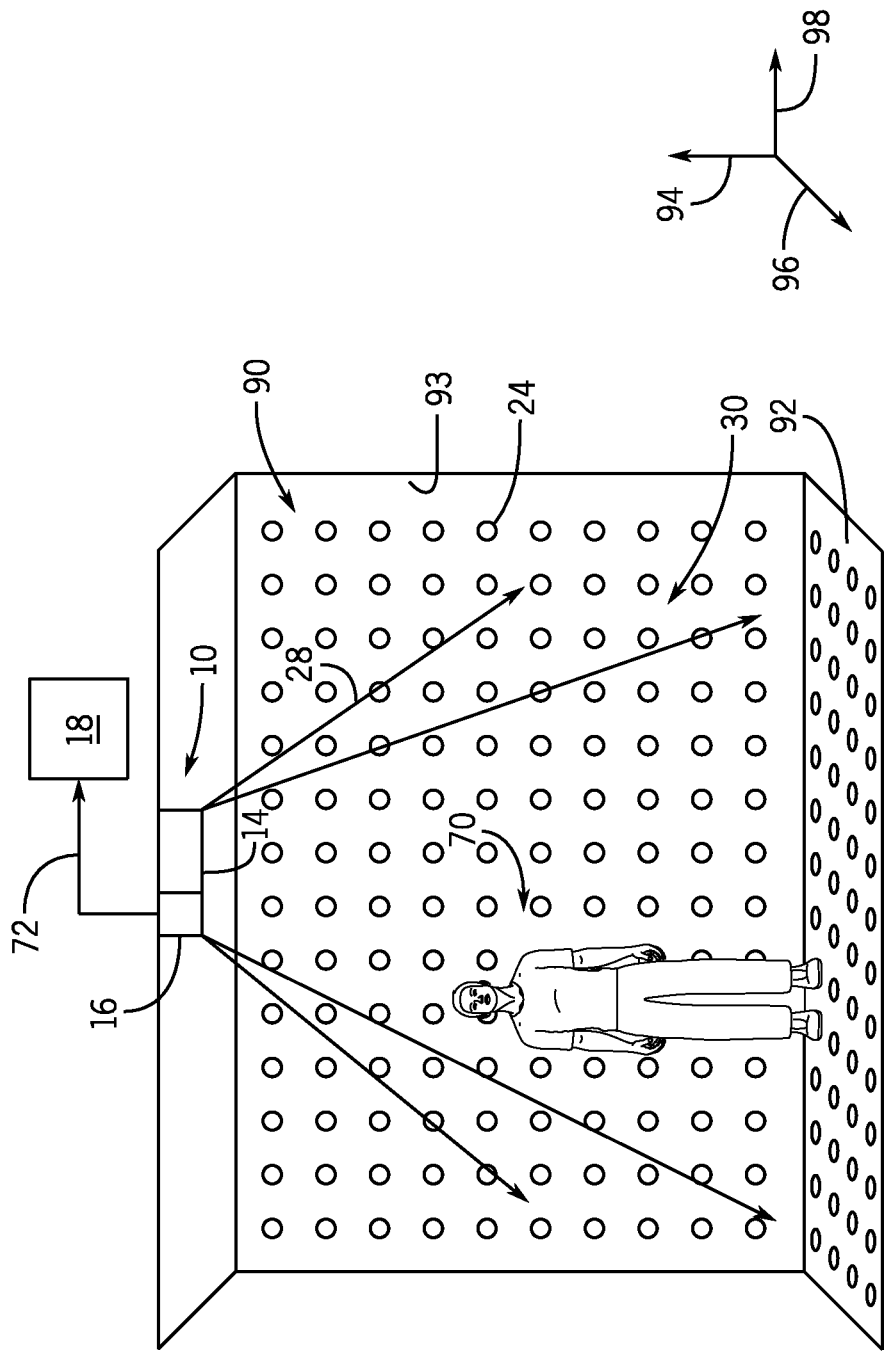

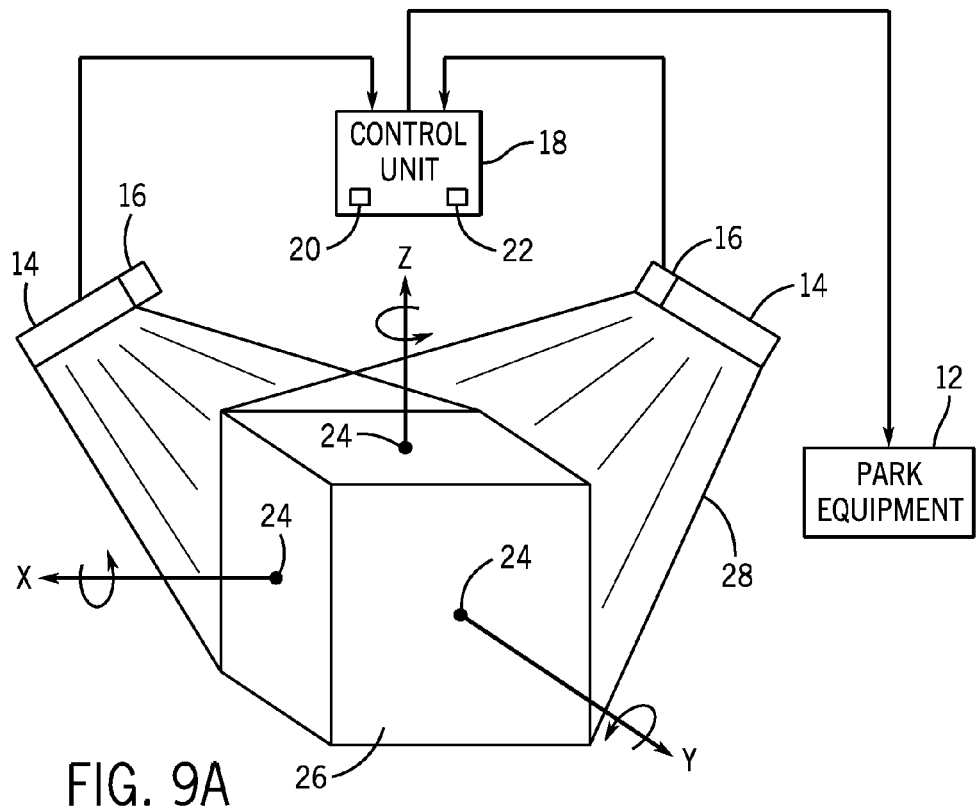
FIG. 9A
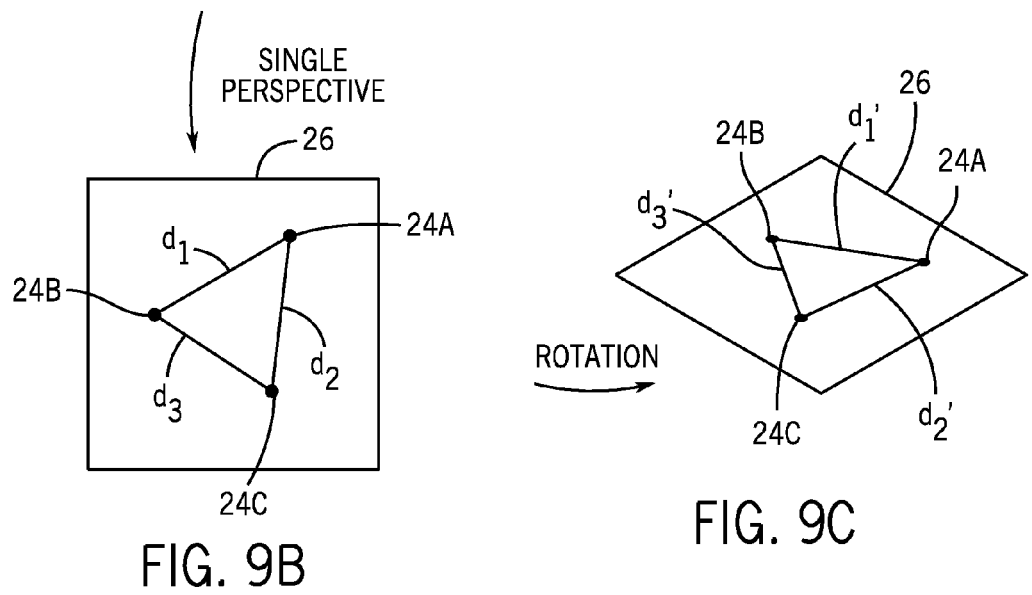
FIG. 9B
FIG. 9C

SYSTEM AND METHOD FOR TRACKING VEHICLES IN PARKING STRUCTURES AND INTERSECTIONS

CROSS REFERENCE TO RELATED APPLICATIONS

This application claims the benefit of U.S. Provisional Application No. 62/001,551, filed May 21, 2014, which is incorporated herein by reference in its entirety for all purposes.

BACKGROUND

The present disclosure relates generally to the field of tracking systems and, more particularly, to methods and equipment used to enable tracking of elements in a variety of contexts through a dynamic signal to noise ratio tracking system.

Tracking systems have been widely used to track motion, position, orientation, and distance, among other aspects, of objects in a wide variety of contexts. Such existing tracking systems generally include an emitter that emits electromagnetic energy and a detector configured to detect the electromagnetic energy, sometimes after it has been reflected off an object. It is now recognized that traditional tracking systems have certain disadvantages and that improved tracking systems are desired for use in a variety of contexts, including amusement park attractions, workplace monitoring, sports, fireworks displays, factory floor management, robotics, security systems, parking, and transportation, among others.

BRIEF DESCRIPTION

In accordance with an embodiment of the present disclosure, a vehicle traffic control system may include an emitter configured to emit electromagnetic radiation into a detection area, a detector configured to detect retro-reflected electromagnetic radiation resulting from retro-reflection of the emitted electromagnetic radiation from retro-reflective elements within the detection area, and control circuitry communicatively coupled to the emitter and the detector. The control circuitry is configured to monitor the retro-reflected electromagnetic radiation detected by the detector and evaluate information relating to one or more vehicles within a detection area based on the monitored retro-reflected electromagnetic radiation. The system also includes an automated device communicatively coupled to the control circuitry and configured to provide a user-perceivable indication relating to the one or more vehicles in the detection area. The control circuitry is configured to cause the automated device to provide specific user-perceivable indications based on the evaluated information relating to the one or more vehicles.

In accordance with another embodiment of the present disclosure, a method of tracking and controlling the movement of vehicles includes flooding a detection area with electromagnetic radiation using an emitter, wherein the detection area corresponds to a portion of a parking structure or a vehicle path, detecting electromagnetic radiation that is retro-reflected from within the detection area using a detector, monitoring the retro-reflected electromagnetic radiation to evaluate information relating to one or more vehicles within the detection area using control circuitry communicatively coupled to at least the detector, and controlling an automated device based, at least in part, on the evaluated vehicle information using the control circuitry to affect movement of the vehicle within the detection area.

In accordance with a further embodiment of the present disclosure, a vehicle traffic control system includes control circuitry configured to monitor retro-reflected electromagnetic radiation and associate the retro-reflective electromagnetic radiation with retro-reflective elements within a detection area, identify changes in the retro-reflected electromagnetic radiation and associate the identified changes with vehicle information, evaluate the vehicle information to determine a movement of the vehicle, a size of the vehicle, a shape of the vehicle, a position of the vehicle, or a combination thereof, and control an automated device based, at least in part, on the evaluated vehicle information to provide a display or output associated with movement of the vehicle or a position of the vehicle, or both, within the detection area.

DRAWINGS

These and other features, aspects, and advantages of the present disclosure will become better understood when the following detailed description is read with reference to the accompanying drawings in which like characters represent like parts throughout the drawings, wherein:

FIG. 7 is a side view of a room with a grid pattern of retro-reflective markers disposed on a wall and a floor of the room for tracking a position of people and objects in the room via the tracking system of FIG. 1, in accordance with an embodiment of the present disclosure;

FIGS. 9A-9C depict the manner in which an object may be tracked in three spatial dimensions by the tracking system of FIG. 1, in accordance with an embodiment of the present disclosure;

Figure 21:
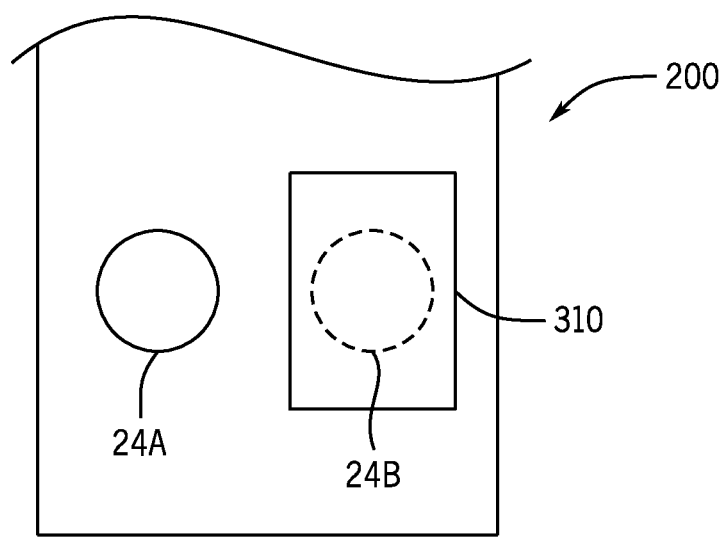
Figure 20:
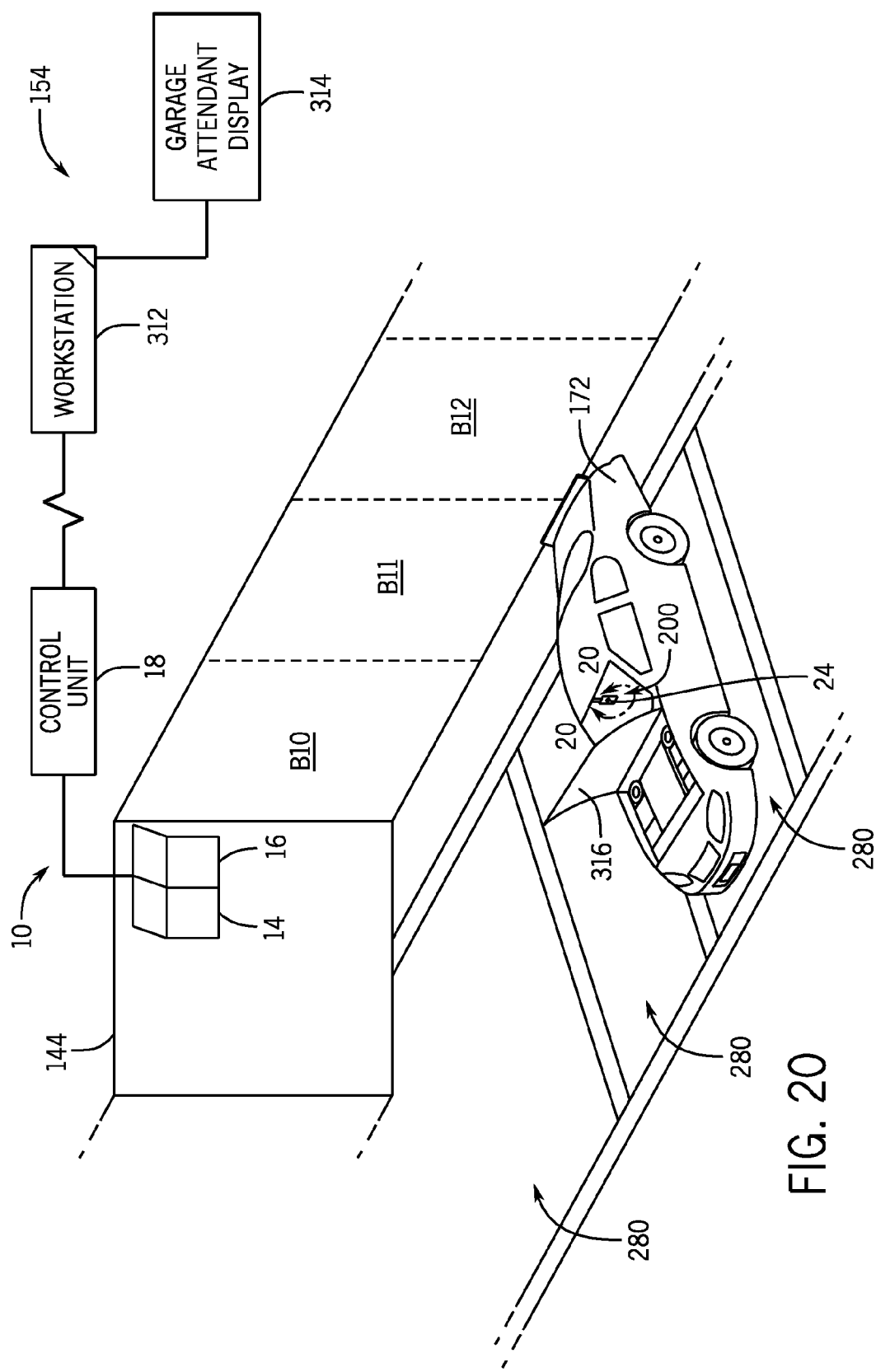
FIG. 20 is a perspective view of a vehicle assistance system within a garage parking structure and utilizing the tracking system to evaluate whether a guest may require assistance with their vehicle, in accordance with an embodiment of the present disclosure.
Figure 22:
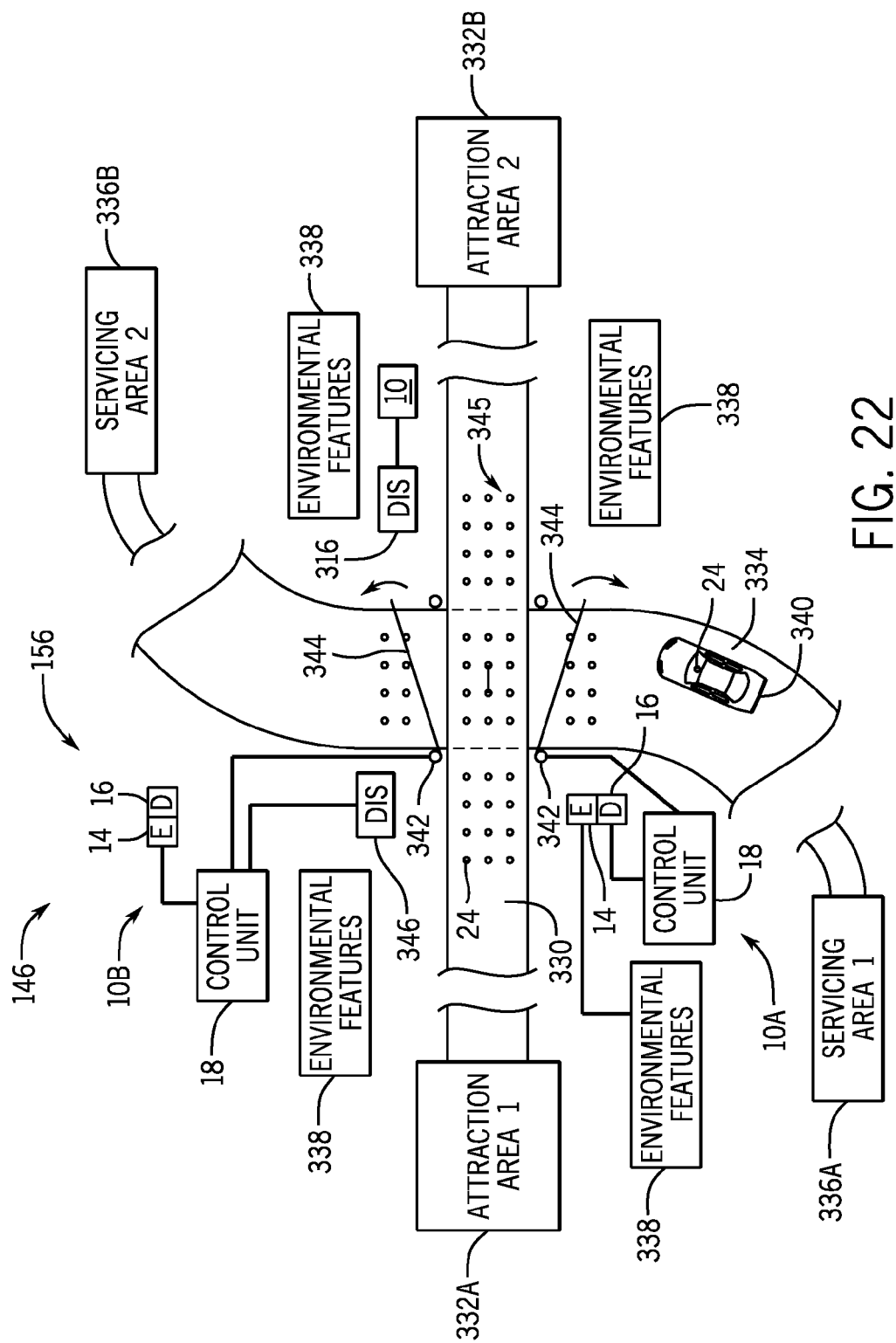

FIG. 21 is an expanded view of a vehicle tag having multiple retro-reflective markers to enable the tracking system of FIG. 20 to evaluate whether a guest is signaling for assistance, in accordance with an embodiment of the present disclosure; and FIG. 22 is an overhead view of a park traffic control system within a park attraction area and utilizing a plurality of the tracking systems to evaluate positions of guests and/or service vehicles, and control access to various pathways based on the evaluated positions, in accordance with an embodiment of the present disclosure.

DETAILED DESCRIPTION

Generally, tracking systems may use a wide variety of inputs obtained from a surrounding environment to track certain objects. The source of the inputs may depend, for instance, on the type of tracking being performed and the capabilities of the tracking system. For example, tracking systems may use sensors disposed in an environment to actively generate outputs received by a main controller. The controller may then process the generated outputs to determine certain information used for tracking. One example of such tracking may include tracking the motion of an object to which a sensor is fixed. Such a system might also utilize one or more devices used to bathe an area in electromagnetic radiation, a magnetic field, or the like, where the electromagnetic radiation or magnetic field is used as a reference against which the sensor's output is compared by the controller. As may be appreciated, such active systems, if implemented to track a large number of objects or even people, could be quite expensive to employ and processor-intensive for the main controller of the tracking system.

Other tracking systems, such as certain passive tracking systems, may perform tracking without providing an illumination source or the like. For instance, certain tracking systems may use one or more cameras to obtain outlines or rough skeletal estimates of objects, people, and so forth. However, in situations where background illumination may be intense, such as outside on a hot and sunny day, the accuracy of such a system may be reduced due to varying degrees of noise received by detectors of the passive tracking system.

With the foregoing in mind, it is now recognized that traditional tracking systems have certain disadvantages and that improved tracking systems are desired for use in a variety of contexts, including amusement park attractions, workplace monitoring, sports, and security systems, among others. For instance, it is presently recognized that improved tracking systems may be utilized to enhance operations in a variety of amusement park settings and other entertainment attractions.

In accordance with one aspect of the present disclosure, a dynamic signal to noise ratio tracking system uses emitted electromagnetic radiation and, in some embodiments, retro-reflection, to enable detection of markers and/or objects within the field of view of the tracking system. The disclosed tracking system may include an emitter configured to emit electromagnetic radiation in a field of view, a sensing device configured to detect the electromagnetic radiation retro-reflected back from objects within the field of view, and a controller configured to perform various processing and analysis routines including interpreting signals from the sensing device and controlling automated equipment based on the detected locations of the objects or markers. The disclosed tracking system may also be configured to track several different objects at the same time (using the same emission and detection features). In some embodiments, the tracking system tracks a location of retro-reflective markers placed on the objects to estimate a location of the objects. As used herein, retro-reflective markers are reflective markers designed to retro-reflect electromagnetic radiation approximately back in the direction from which the electromagnetic radiation was emitted. More specifically, retro-reflective markers used in accordance with the present disclosure, when illuminated, reflect electromagnetic radiation back toward the source of emission in a narrow cone. In contrast, certain other reflective materials, such as shiny materials, may undergo diffuse reflection where electromagnetic radiation is reflected in many directions. Further still, mirrors, which also reflect electromagnetic radiation, do not typically undergo retro-reflection. Rather, mirrors undergo specular reflection, where an angle of electromagnetic radiation (e.g., light such as infrared, ultraviolet, visible, or radio waves and so forth) incident onto the mirror is reflected at an equal but opposite angle (away from the emission source).

Retro-reflective materials used in accordance with the embodiments set forth below can be readily obtained from a number of commercial sources. One example includes retro-reflective tape, which may be fitted to a number of different objects (e.g., environmental features, clothing items, toys). Due to the manner in which retro-reflection occurs using such markers in combination with the detectors 16 used in accordance with the present disclosure, the retro-reflective markers cannot be washed out by the sun or even in the presence of other emitters that emit electromagnetic radiation in wavelengths that overlap with the wavelengths of interest. Accordingly, the disclosed tracking system may be more reliable, especially in an outdoor setting and in the presence of other electromagnetic emission sources, compared to existing optical tracking systems.

While the present disclosure is applicable to a number of different contexts, presently disclosed embodiments are directed to, among other things, various aspects relating to controlling amusement park equipment (e.g., automated equipment) based on information obtained from such a dynamic signal to noise ratio tracking system. Indeed, it is presently recognized that by using the disclosed tracking systems, reliable and efficient amusement park operations may be carried out, even though there are a number of moving objects, guests, employees, sounds, lights, and so forth, in an amusement park, which could otherwise create high levels of noise for other tracking systems.

In certain aspects of the present disclosure, a control system of the amusement park (e.g., a control system associated with a particular area of the amusement park, such as a ride) may use information obtained by the dynamic signal to noise ratio tracking system to monitor and evaluate information relating to vehicles (e.g., guest vehicles, service vehicles) in the area to determine whether certain automated processes may be triggered or otherwise allowed to proceed. The evaluated information pertaining to vehicles in the amusement park may include, for instance, a location, a movement, a size, or other information relating to one or more vehicles in a parking structure, at an intersection, or within attraction areas of the amusement park. By way of non-limiting example, the information may be evaluated to determine whether vehicles are of an appropriate size and shape to fit into a parking space, whether the vehicle is authorized to park within certain parking structures, to facilitate movement through a parking structure, to provide a parking space recommendation, and so forth.

As a result of performing such evaluations, the control system may generate control signals or some other output that causes certain automated equipment in the guest attraction area (or other area of the amusement park) to perform specific functions. The functions performed by the automated equipment may include, for instance, automatically opening and closing access gates, illuminating lights that serve as warnings or similar indicators to vehicle drivers, and similar actions.

Certain aspects of the present disclosure may be better understood with reference to FIG. 1, which generally illustrates the manner in which a dynamic signal to noise ratio tracking system 10 (hereinafter referred to as "tracking system 10") may be integrated with amusement park equipment 12 in accordance with present embodiments. As illustrated, the tracking system 10 includes an emitter 14 (which may be all or a part of an emission subsystem having one or more emission devices and associated control circuitry) configured to emit one or more wavelengths of electromagnetic radiation (e.g., light such as infrared, ultraviolet, visible, or radio waves and so forth) in a general direction. The tracking system 10 also includes a detector 16 (which may be all or a part of a detection subsystem having one or more sensors, cameras, or the like, and associated control circuitry) configured to detect electromagnetic radiation reflected as a result of the emission, as described in further detail below.

To control operations of the emitter 14 and detector 16 (emission subsystem and detection subsystem) and perform various signal processing routines resulting from the emission, reflection, and detection process, the tracking system 10 also includes a control unit 18 communicatively coupled to the emitter 14 and detector 16. Accordingly, the control unit 18 may include one or more processors 20 and one or more memory 22, which may generally referred to herein as "processing circuitry." By way of specific but non-limiting example, the one or more processors 20 may include one or more application specific integrated circuits (ASICs), one or more field programmable gate arrays (FPGAs), one or more general purpose processors, or any combination thereof. Additionally, the one or more memory 22 may include volatile memory, such as random access memory (RAM), and/or non-volatile memory, such as read-only memory (ROM), optical drives, hard disc drives, or solid-state drives. In some embodiments, the control unit 18 may form at least a portion of a control system configured to coordinate operations of various amusement park features, including the equipment 12. As described below, such an integrated system may be referred to as an amusement park attraction and control system.

The tracking system 10 is specifically configured to detect a position of an illuminated component, such as a retro-reflective marker 24 having a properly correlated retro-reflective material relative to a grid, pattern, the emission source, stationary or moving environmental elements, or the like. In some embodiments, the tracking system 10 is designed to utilize the relative positioning to identify whether a correlation exists between one or more such illuminated components and a particular action to be performed by the amusement park equipment 12, such as triggering of a show effect, dispatch of a ride vehicle, closure of a gate, synchronization of security cameras with movement, and so on. More generally, the action may include the control of machine movement, image formation or adaptation, and similar processes.

As illustrated, the retro-reflective marker 24 is positioned on an object 26, which may correspond to any number of static or dynamic features. For instance, the object 26 may represent boundary features of an amusement park attraction, such as a floor, a wall, a gate, or the like, or may represent an item wearable by a guest, park employee, or similar object. Indeed, as set forth below, within an amusement park attraction area, many such retro-reflective markers 24 may be present, and the tracking system 10 may detect reflection from some or all of the markers 24, and may perform various analyses based on this detection.

Referring now to the operation of the tracking system 10, the emitter 14 operates to emit electromagnetic radiation, which is represented by an expanding electromagnetic radiation beam 28 electromagnetic radiation beam 28 for illustrative purposes, to selectively illuminate, bathe, or flood a detection area 30 in the electromagnetic radiation. Electromagnetic radiation beam 28 is intended to generally represent any form of electromagnetic radiation that may be used in accordance with present embodiments, such as forms of light (e.g., infrared, visible, UV) and/or other bands of the electromagnetic spectrum (e.g., radio waves and so forth). However, it is also presently recognized that, in certain embodiments, it may be desirable to use certain bands of the electromagnetic spectrum depending on various factors. For example, in one embodiment, it may be desirable to use forms of electromagnetic radiation that are not visible to the human eye or within an audible range of human hearing, so that the electromagnetic radiation used for tracking does not distract guests from their experience. Further, it is also presently recognized that certain forms of electromagnetic radiation, such as certain wavelengths of light (e.g., infrared) may be more desirable than others, depending on the particular setting (e.g., whether the setting is "dark," or whether people are expected to cross the path of the beam). Again, the detection area 30 may correspond to all or a part of an amusement park attraction area, such as a stage show, a ride vehicle loading area, a waiting area outside of an entrance to a ride or show, and so forth.

The electromagnetic radiation beam 28, in certain embodiments, may be representative of multiple light beams (beams of electromagnetic radiation) being emitted from different sources (all part of an emission subsystem). Further, in some embodiments the emitter 14 is configured to emit the electromagnetic radiation beam 28 at a frequency that has a correspondence to a material of the retro-reflective marker 24 (e.g., is able to be reflected by the retro-reflective elements of the marker 24). For instance, the retro-reflective marker 24 may include a coating of retro-reflective material disposed on a body of the object 26 or a solid piece of material coupled with the body of the object 26. By way of more specific but non-limiting example, the retro-reflective material may include spherical and/or prismatic reflective elements that are incorporated into a reflective material to enable retro-reflection to occur. Again, in certain embodiments many such retro-reflective markers 24 may be present, and may be arranged in a particular pattern stored in the memory 22 to enable further processing, analysis, and control routines to be performed by the control unit 18 (e.g., control system).

The retro-reflective marker 24 may reflect a majority of the electromagnetic radiation (e.g., infrared, ultraviolet, visible wavelengths, or radio waves and so forth) incident from the electromagnetic radiation beam 28 back toward the detector 16 within a relatively well-defined cone having a central axis with substantially the same angle as the angle of incidence. This reflection facilitates identification of a location of the retro-reflective marker 24 by the system 10 and correlation thereof to various information stored in the memory 22 (e.g., patterns, possible locations). This location information (obtained based on the reflected electromagnetic radiation) may then be utilized by the control unit 18 to perform various analysis routines and/or control routines, for example to determine whether to cause triggering or other control of the amusement park equipment 12.

Specifically, in operation, the detector 16 of the system 10 may function to detect the electromagnetic radiation beam 28 retro-reflected from the retro-reflective marker 24 and provide data associated with the detection to the control unit 18 via communication lines 31 for processing. The detector 16 may operate to specifically identify the marker 24 based on certain specified wavelengths of electromagnetic radiation emitted and reflected and, thus, avoid issues with false detections. For example, the detector 16 may be specifically configured to detect certain wavelengths of electromagnetic radiation (e.g., corresponding to those emitted by the emitter 14) through the use of physical electromagnetic radiation filters, signal filters, and the like. Further, the detector 16 may utilize a specific arrangement of optical detection features and electromagnetic radiation filters to capture substantially only retro-reflected electromagnetic radiation.

For example, the detector 16 may be configured to detect wavelengths of electromagnetic radiation retro-reflected by the retro-reflective markers 24 while filtering wavelengths of electromagnetic radiation not retro-reflected by the markers 24, including those wavelengths of interest. Thus, the detector 16 may be configured to specifically detect (e.g., capture) retro-reflected electromagnetic radiation while not detecting (e.g., capturing) electromagnetic radiation that is not retro-reflected. In one embodiment, the detector 16 may utilize the directionality associated with retro-reflection to perform this selective filtering. Accordingly, while the detector 16 receives electromagnetic radiation from a variety of sources (including spuriously reflected electromagnetic radiation, as well as environmental electromagnetic radiation), the detector 16 is specifically configured to filter out all or substantially all spuriously reflected signals while retaining all or substantially all intended signals. Thus, the signal-to-noise ratio of signals actually processed by the detector 16 and control unit 18 is very high, regardless of the signal-to-noise ratio that exists for the electromagnetic bands of interest outside of the detector 16.

For example, the detector 16 may receive retro-reflected electromagnetic radiation (e.g., from the retro-reflective markers 24) and ambient electromagnetic radiation from within an area (e.g., guest attraction area). The ambient electromagnetic radiation may be filtered, while the retro-reflected electromagnetic radiation, which is directional, may not be filtered (e.g., may bypass the filter). Thus, in certain embodiments, the "image" generated by the detector 16 may include a substantially dark (e.g., black or blank) background signal, with substantially only retro-reflected electromagnetic radiation producing contrast.

In accordance with certain embodiments, the retro-reflected electromagnetic radiation may include different wavelengths that are distinguishable from one another. In one embodiment, the filters of the detector 16 may have optical qualities and may be positioned within the detector such that the optical detection devices of the detector 16 substantially only receive electromagnetic wavelengths retro-reflected by the retro-reflective markers 24 (or other retro-reflective elements), as well as any desired background wavelengths (which may provide background or other landscape information). To produce signals from the received electromagnetic radiation, as an example, the detector 16 may be a camera having a plurality of electromagnetic radiation capturing features (e.g., charge-coupled devices (CCDs) and/or complementary metal oxide semiconductor (CMOS) sensors corresponding to pixels). In one example embodiment, the detector 16 may be an Amp® high dynamic range (HDR) camera system available from Contrast Optical Design and Engineering, Inc. of Albuquerque, N. Mex.

Because retro-reflection by the retro-reflective markers 24 is such that a cone of reflected electromagnetic radiation is incident on the detector 16, the control unit 18 may in turn correlate a center of the cone, where the reflected electromagnetic radiation is most intense, to a point source of the reflection. Based on this correlation, the control unit 18 may identify and track a location of this point source, or may identify and monitor a pattern of reflection by many such retro-reflective markers 24.

For instance, once the control unit 18 receives the data from the detector 16, the control unit 18 may employ known visual boundaries or an established orientation of the detector 16 to identify a location (e.g., coordinates) corresponding to the detected retro-reflective marker 24. When multiple stationary retro-reflective markers 24 are present, the control unit 18 may store known positions (e.g., locations) of the retro-reflective markers 24 to enable reflection pattern monitoring. By monitoring a reflection pattern, the control unit 18 may identify blockage (occlusion) of certain retro-reflective markers 24 by various moving objects, guests, employees, and so forth. It should also be noted that the bases for these comparisons may be updated based on, for example, how long a particular retro-reflective marker 24 has been positioned and used in its location. For instance, the stored pattern of reflection associated with one of the markers 24 may be updated periodically during a calibration stage, which includes a time period during which no objects or people are expected to pass over the marker 24. Such re-calibrations may be performed periodically so that a marker that has been employed for an extended period of time and has lost its retro-reflecting capability is not mistaken for a detected occlusion event.

In other embodiments, in addition to or in lieu of tracking one or more of the retro-reflective markers 24, the tracking system 10 may be configured to detect and track various other objects located within the detection area 30. Such objects 32 may include, among other things, ride vehicles, people (e.g., guests, employees), and other moving park equipment. For example, the detector 16 of the system 10 may function to detect the electromagnetic radiation beam 28 bouncing off of an object 32 (without retro-reflective markers 24) and provide data associated with this detection to the control unit 18. That is, the detector 16 may detect the object 32 based entirely on diffuse or specular reflection of electromagnetic energy off the object 32. In some embodiments, the object 32 may be coated with a particular coating that reflects the electromagnetic radiation beam 28 in a detectable and predetermined manner. Accordingly, once the control unit 18 receives the data from the detector 16, the control unit 18 may determine that the coating associated with the object 32 reflected the electromagnetic radiation, and may also determine the source of the reflection to identify a location of the object 32.

Whether the retro-reflective markers 24 are stationary or moving, the process of emitting the electromagnetic radiation beam 28, sensing of the reflected electromagnetic radiation from the retro-reflective markers 24 (or objects 32 with no or essentially no retro-reflective material), and determining a location of the retro-reflective marker 24 or object 32 may be performed by the control unit 18 numerous times over a short period. This process may be performed at distinct intervals, where the process is initiated at predetermined time points, or may be performed substantially continuously, such that substantially immediately after the process is completed, it is re-initiated. In embodiments where the retro-reflective markers 24 are stationary and the control unit 18 performs retro-reflective pattern monitoring to identify marker blockage, the process may be performed at intervals to obtain a single retro-reflective pattern at each interval. This may be considered to represent a single frame having a reflection pattern corresponding to a pattern of blocked and unblocked retro-reflective markers 24.

On the other hand, such procedures may essentially be performed continuously to facilitate identification of a path and/or trajectory through which the retro-reflective marker 24 has moved. The marker 24, moving within the detection area 30, would be detected over a particular timeframe or simply in continuous series. Here, the pattern of reflection would be generated and identified over a time period.

In accordance with the embodiments set forth above, the detector 16 and control unit 18 may operate on a variety of different timeframes depending on the tracking to be performed and the expected movement of the tracked object through space and time. As an example, the detector 16 and the control unit 18 may operate in conjunction to complete all logical processes (e.g., updating analysis and control signals, processing signals) in the time interval between the capture events of the detector 16. Such processing speeds may enable substantially real-time tracking, monitoring, and control where applicable. By way of non-limiting example, the detector capture events may be between approximately $\frac{1}{60}$ of a second and approximately $\frac{1}{30}$ of a second, thus generating between 30 and 60 frames per second. The detector 16 and the control unit 18 may operate to receive, update, and process signals between the capture of each frame. However, any interval between capture events may be utilized in accordance with certain embodiments.

Once a particular pattern of retro-reflection has been detected, a determination may be made by the control unit 18 as to whether the pattern correlates to a stored pattern identified by the control unit 18 and corresponding to a particular action to be performed by the amusement park equipment 12. For example, the control unit 18 may perform a comparison of a position, path, or trajectory of the retro-reflective marker 24 with stored positions, paths, or trajectories to determine an appropriate control action for the equipment 12. Additionally or alternatively, as described in further detail below, the control unit 18 may determine whether a particular pattern obtained at a particular time point correlates to a stored pattern associated with a particular action to be performed by the amusement park equipment 12. Further still, the control unit 18 may determine whether a set of particular patterns obtained at particular time points correlate to a stored pattern change associated with a particular action to be performed by the amusement park equipment 12.

While the control unit 18 may cause certain actions to be automatically performed within the amusement park in the manner set forth above, it should be noted that similar analyses to those mentioned above may also be applied to the prevention of certain actions (e.g., where the park equipment 12 blocks action or is blocked from performing an action). For example, in situations where a ride vehicle can be automatically dispatched, the control unit 18, based upon tracking changes in the retro-reflective markers 24, may halt automatic dispatching, or may even prevent dispatching by a ride operator until additional measures are taken (e.g., additional confirmations that the ride vehicle is cleared for departure). This type of control may be applied to other amusement park equipment, as well. For example, flame effects, fireworks, or similar show effects may be blocked from being triggered, may be stopped, or may be reduced in intensity, due to intervention by the control unit 18 as a result of certain pattern determinations as described herein.

Having generally described the configuration of the system 10, it should be noted that the arrangement of the emitter 14, detector 16, control unit 18, and other features may vary based on application-specific considerations and the manner in which the control unit 18 performs evaluations based on electromagnetic radiation from the retro-reflective markers 24. In the embodiment of the tracking system 10 illustrated in FIG. 1, the emitter 14 and the sensor or detector 16 are integral features such that a plane of operation associated with the detector 16 is essentially overlapping with a plane of operation associated with the emitter 14. That is, the detector 16 is located in substantially the same position as the emitter 14, which may be desirable due to the retro-reflectivity of the markers 24. However, the present disclosure is not necessarily limited to this configuration. For instance, as noted above, retro-reflection may be associated with a cone of reflection, where the highest intensity is in the middle of the reflected cone. Accordingly, the detector 16 may be positioned within an area where the reflected cone of the retro-reflective markers is less intense than its center, but may still be detected by the detector 16.

Figure 2:
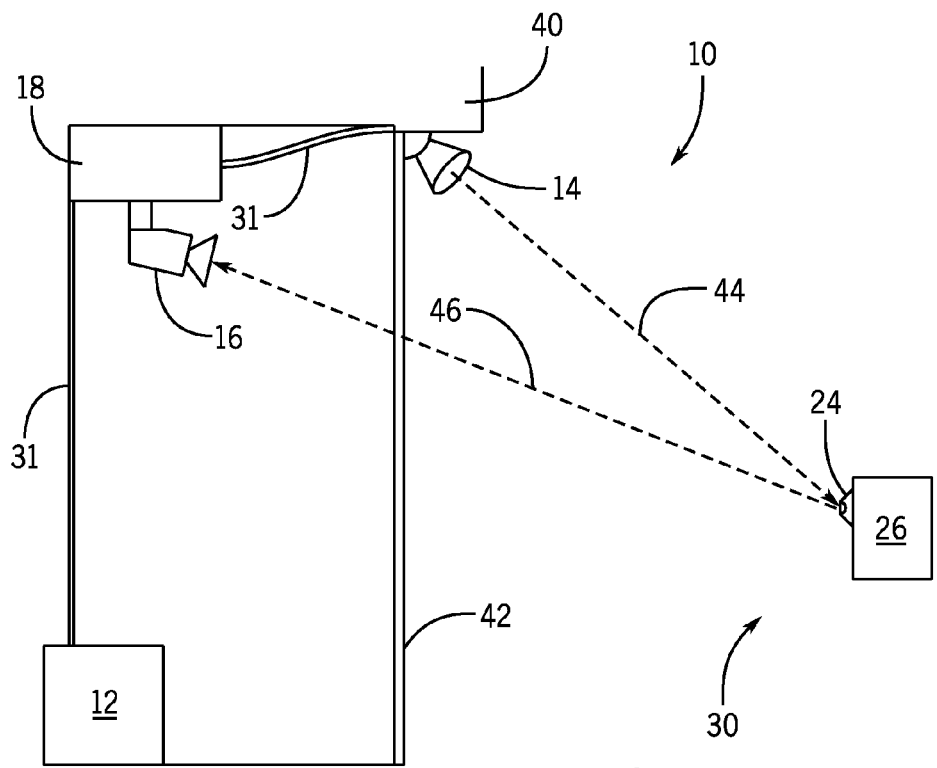
FIG. 2 is a schematic diagram of another tracking system utilizing a dynamic signal to noise ratio device to track objects, in accordance with an embodiment of the present disclosure.

By way of non-limiting example, in some embodiments, the emitter 14 and the detector 16 may be concentric. However, the detector 16 (e.g., an infrared camera) may be positioned in a different location with respect to the emitter 14, which may include an infrared light bulb, one or more diode emitters, or similar source. As illustrated in FIG. 2, the emitter 14 and detector 16 are separate and are positioned at different locations on an environmental feature 40 of an amusement attraction area (e.g., a wall or ceiling). Specifically, the emitter 14 of FIG. 2 is positioned outside of a window 42 of a storefront containing other components of the system 10. The detector 16 of FIG. 2 is positioned away from the emitter 14, but is still oriented to detect electromagnetic radiation reflected from the retro-reflective marker 24 and originating from the emitter 14.

For illustrative purposes, arrows 44, 46 represent a light beam (a beam of electromagnetic radiation) being emitted from the emitter 14 (arrow 44) into the detection area 30, retro-reflected by the retro-reflective marker 24 on the object 26 (arrow 46), and detected by the detector 16. The light beam represented by the arrow 44 is merely one of numerous electromagnetic radiation emissions (light beams) that flood or otherwise selectively illuminate the detection area 30 from the emitter 14. It should be noted that still other embodiments may utilize different arrangements of components of the system 10 and implementations in different environments in accordance with the present disclosure.

Figure 1:
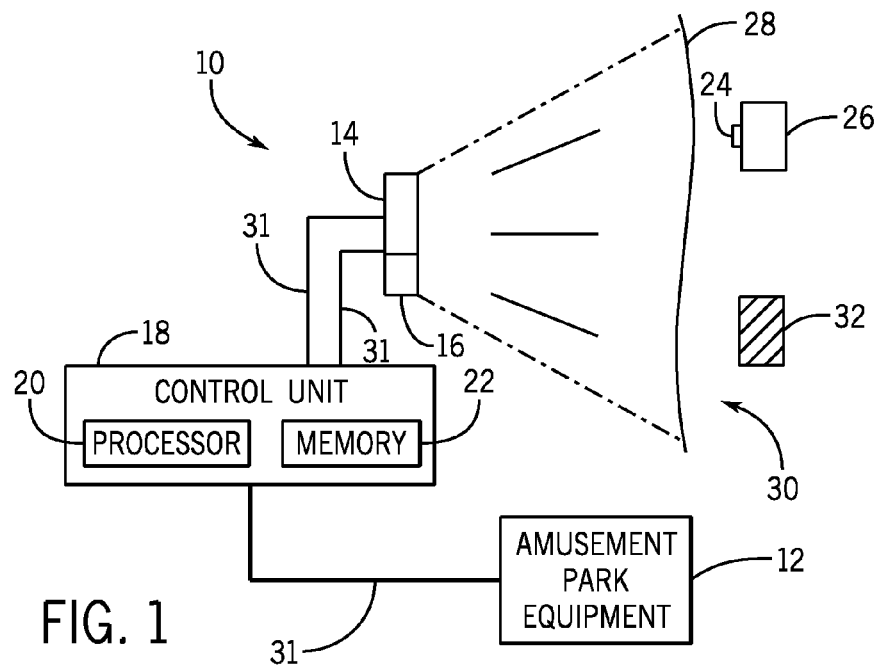
FIG. 1 is a schematic diagram of a tracking system utilizing a dynamic signal to noise ratio device to track objects, in accordance with an embodiment of the present disclosure.

Having now discussed the general operation of the tracking system 10 to detect a position of retro-reflective markers 24 and/or objects 32, as illustrated in FIG. 1, certain applications of the tracking system 10 will be described in further detail below. For example, it may be desirable to track the locations of people within a particular area through the use of the disclosed tracking systems. This may be useful, for example, for controlling lines in a ride vehicle loading area, controlling access to different areas, determining appropriate instances when show effects can be triggered, determining appropriate instances when certain automated machinery can be moved, and may also be useful for assisting a live show performance (e.g., blocking actors on a stage). That is, during performances, actors are supposed to be standing at particular positions on the stage at certain times. To ensure that the actors are hitting their appropriate positions at the right time, the tracking system 10 may be installed above the stage and used to track the positions and/or motion of all the actors on the stage. Feedback from the tracking system 10 may be utilized to evaluate how well the actors are hitting the desired spots on the stage.

In addition to blocking on a stage, the tracking system 10 may be used in contexts that involve tracking and/or evaluating shoppers in a store or other commercial setting. That is, a store may be outfitted with the disclosed tracking systems 10 in order to determine where guests are spending time within the store. Instead of triggering a show effect, such tracking systems 10 may be used to monitor the flow of people within the store and control the availability of certain items as a result, control the flow of movement of people, etc. For instance, information collected via the disclosed tracking systems 10 may be used to identify and evaluate which setups or displays within the store are most attractive, to determine what items for sale are the most popular, or to determine which areas of the store, if any, are too crowded. This information may be analyzed and used to improve the store layout, product development, and crowd management, among other things.

It should be noted that other applications may exist for tracking positions of people, objects, machines, etc. within an area other than those described above. Presently disclosed tracking systems 10 may be configured to identify and/or track the position and movement of people and/or objects within the detection area 30. The tracking system 10 may accomplish this tracking in several different ways, which were introduced above and are explained in further detail below. It should be noted that the tracking system 10 is configured to detect a position of one or more people, one or more objects 32, or a combination of different features, at the same time in the same detection area 30 using the single emitter 14, detector 16, and control unit 18. However, the use of multiple such emitters 14, detectors 16, and control units 18 is also within the scope of the present disclosure. Accordingly, there may be one or more of the emitters 14 and one or more of the detectors 16 in the detection area 30. Considerations such as the type of tracking to be performed, the desired range of tracking, for redundancy, and so forth, may at least partially determine whether multiple or a single emitter and/or detector are utilized.

For instance, as noted above, the tracking system 10 may generally be configured to track a target moving in space and in time (e.g., within the detection area 30 over time). When a single detection device (e.g., detector 16) is utilized, the tracking system 10 may monitor retro-reflected electromagnetic radiation from a defined orientation to track a person, object, etc. Because the detector 16 has only one perspective, such detection and tracking may, in some embodiments, be limited to performing tracking in only one plane of movement (e.g., the tracking is in two spatial dimensions). Such tracking may be utilized, as an example, in situations where the tracked target has a relatively low number of degrees of freedom, such as when movement is restricted to a constrained path (e.g., a track). In one such embodiment, the target has a determined vector orientation.

On the other hand, when multiple detection devices are utilized (e.g., two or more of the detectors 16) to track a target in both space and time, the tracking system 10 may monitor retro-reflected electromagnetic radiation from multiple orientations. Using these multiple vantage points, the tracking system 10 may be able to track targets having multiple degrees of freedom. In other words, the use of multiple detectors may provide both vector orientation and range for the tracked target. This type of tracking may be particularly useful in situations where it may be desirable to allow the tracked target to have unrestricted movement in space and time.

Multiple detectors may also be desirable for redundancy in the tracking. For example, multiple detection devices applied to scenarios where movement of the target is restricted, or not, may enhance the reliability of the tracking performed by the tracking system 10. The use of redundant detectors 16 may also enhance tracking accuracy, and may help prevent geometric occlusion of the target by complex geometric surfaces, such as winding pathways, hills, folded clothing, opening doors, and so on.

Figure 3:
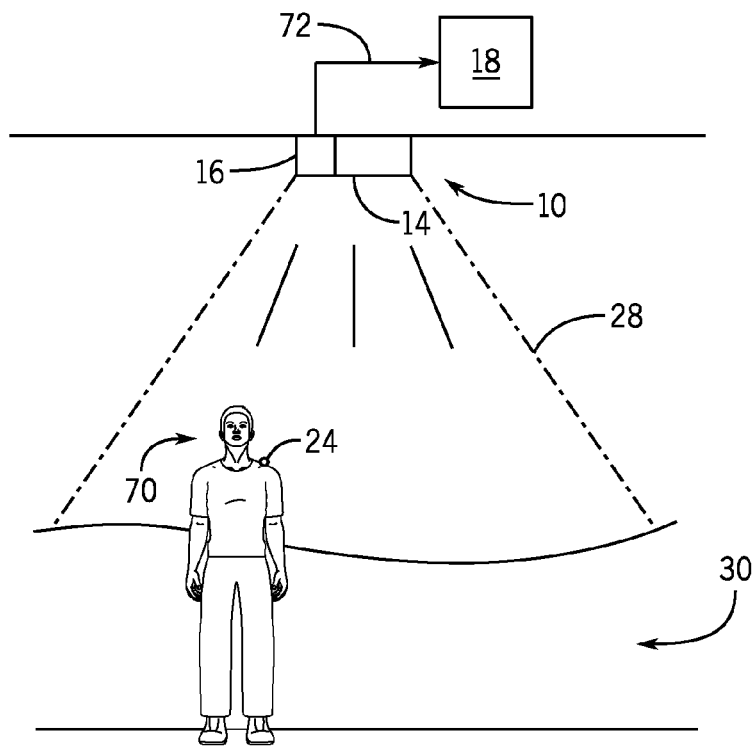
FIG. 3 is a schematic view of the tracking system of FIG. 1 tracking a retro-reflective marker on a person, in accordance with an embodiment of the present disclosure.

In accordance with one aspect of the present disclosure, the tracking system 10 may track relative positions of multiple targets (e.g., people, objects, machines) positioned within the detection area 30 through the use of the retro-reflective markers 24. As illustrated in FIG. 3, the retro-reflective markers 24 may be disposed on a person 70. Additionally or alternatively, the marker 24 may be positioned on a machine or other object (e.g., object 26). Accordingly, the techniques disclosed herein for tracking movement of the person 70 in space and time may also be applied to movement of an object in the amusement park, either in addition to the person 70 or as an alternative to the person 70. In such embodiments, the marker 24 may be positioned on an outside of the object 26 (e.g., a housing), as shown in FIG. 1.

In the illustrated embodiment of FIG. 3, the retro-reflective marker 24 is disposed on the outside of the person's clothing. For instance, the retro-reflective marker 24 may be applied as a strip of retro-reflective tape applied to an armband, headband, shirt, personal identification feature, or other article. Additionally or alternatively, the retro-reflective marker 24 may, in some embodiments, be sewn into clothing or applied to the clothing as a coating. The retro-reflective marker 24 may be disposed on the clothing of the person 70 in a position that is accessible to the electromagnetic radiation beam 28 being emitted from the emitter 14. As the person 70 walks about the detection area 30 (in the case of the object 32, the object 32 may move through the area 30), the electromagnetic radiation beam 28 reflects off the retro-reflective marker 24 and back to the detector 16. The detector 16 communicates with the control unit 18 by sending a signal 72 to the processor 20, this signal 72 being indicative of the reflected electromagnetic radiation detected via the detector 16. The tracking system 10 may interpret this signal 72 to track the position or path of the person 70 (or object 32) moving about a designated area (i.e., track the person or object in space and time). Again, depending on the number of detectors 16 utilized, the control unit 18 may determine vector magnitude, orientation, and sense of the person and/or object's movement based on the retro-reflected electromagnetic radiation received.

Figure 4:
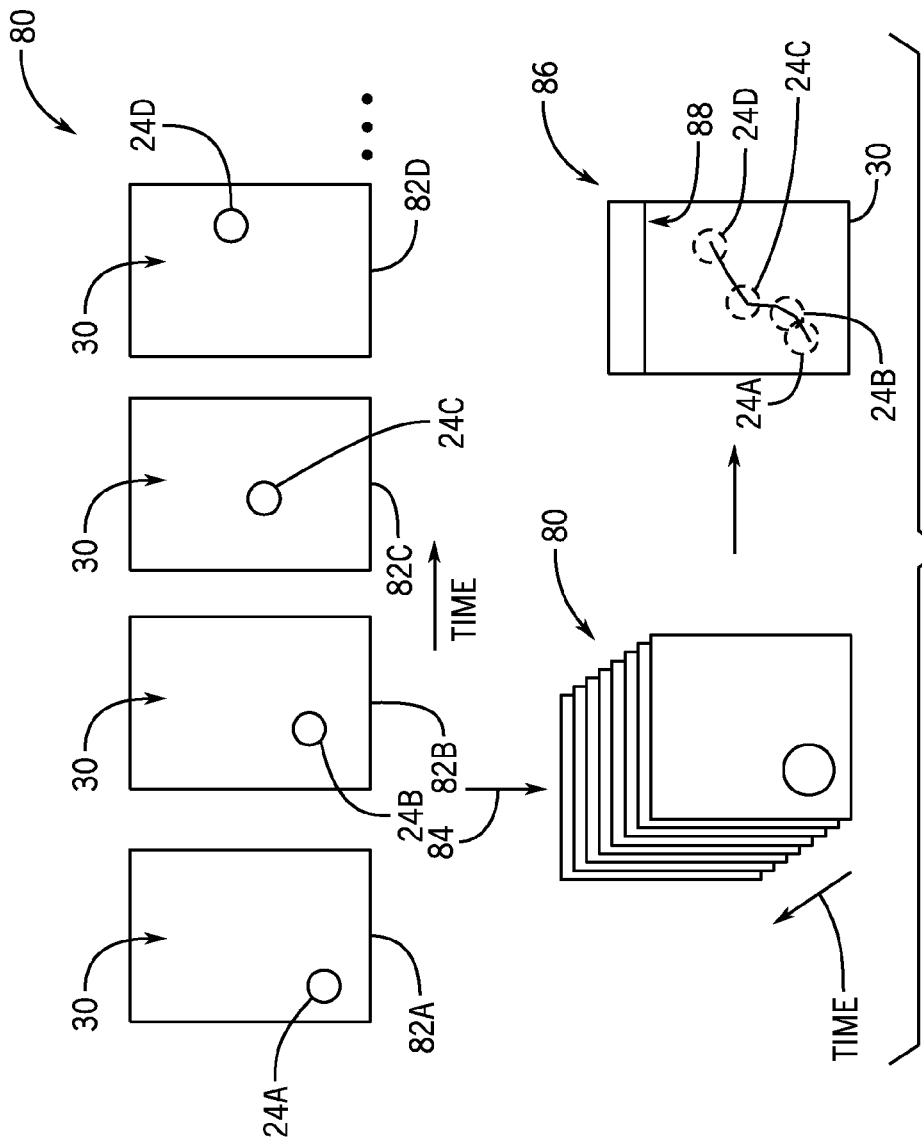
FIG. 4 is a schematic representation of an analysis performed by the tracking system of FIG. 1 in which position and movement of a person or object is tracked in space and time, in accordance with an embodiment of the present disclosure.

The tracking of the person 70 (which may also be representative of a moving object) is illustrated schematically in FIG. 4. More specifically, FIG. 4 illustrates a series 80 of frames 82 captured by the detector 16 (e.g., camera) over a period of time. As noted above, a plurality of such frames (e.g., between 30 and 60) may be generated every second in certain embodiments. It should be noted that FIG. 4 may not be an actual representation of outputs produced by the tracking system 10, but is described herein to facilitate an understanding of the tracking and monitoring performed by the control unit 18. The frames 82 each represent the detection area 30, and the position of the retro-reflective marker 24 within the area 30. Alternatively, the frames 82 may instead represent marker blockage within the area 30, for example where a grid of markers 24 are occluded by an object or person.

As shown, a first frame 82A includes a first instance of the retro-reflective marker, designated as 24A, having a first position. As the series 80 progresses in time, a second frame 82B includes a second instance of the retro-reflective marker 24B, which is displaced relative to the first instance, and so on (thereby producing third and fourth instances of the retro-reflective marker 24C and 24D). After a certain period of time, the control unit 18 has generated the series 80, where the operation of generating the series 80 is generally represented by arrow 84.

The series 80 may be evaluated by the control unit 18 in a number of different ways. In accordance with the illustrated embodiment, the control unit 18 may evaluate movement of the person 70 or object 32 by evaluating the positions of the marker 24 (or blockage of certain markers) over time. For example, the control unit 18 may obtain vector orientation, range, and sense, relating to the movement of the tracked target depending on the number of detectors 16 utilized to perform the tracking. In this way, the control unit 18 may be considered to evaluate a composite frame 86 representative of the movement of the tracked retro-reflective marker 24 (or tracked blockage of markers 24) over time within the detection area 30. Thus, the composite frame 86 includes the various instances of the retro-reflective marker 24 (including 24A, 24B, 24C, 24D), which may be analyzed to determine the overall movement of the marker 24 (and, therefore, the person 70 and/or object 26, whichever the case may be).

As also illustrated in FIG. 4, this monitoring may be performed relative to certain environmental elements 88, which may be fixed within the detection area 30 and/or may be associated with reflective materials. The control unit 18 may perform operations not only based on the detected positions of the marker 24, but also based on extrapolated movement (e.g., a projected path of the retro-reflective marker 24 through the detection area 30 or projected positions of marker grid occlusion) in relation to the environmental elements 88.

Figure 5:
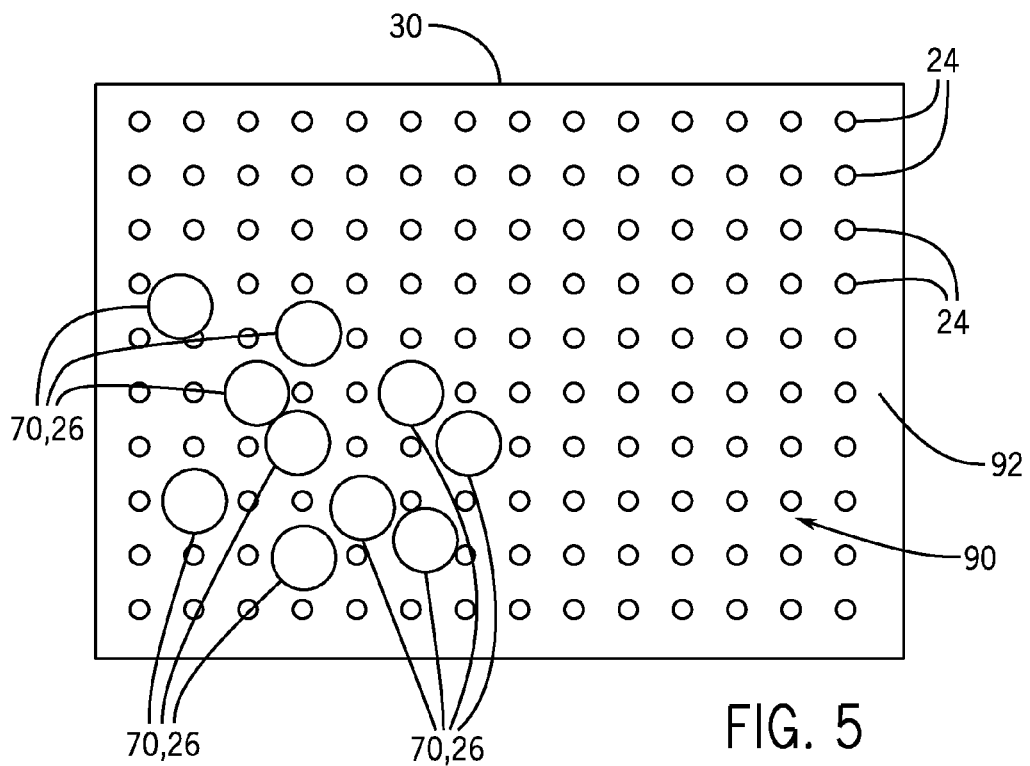
FIG. 5 is an overhead view of a room with a grid pattern of retro-reflective markers for tracking a position of people in the room via the tracking system of FIG. 1, in accordance with an embodiment of the present disclosure.

Another method for tracking one or more people 70 or objects 32 in an area is illustrated schematically in FIG. 5. Specifically, FIG. 5 represents an overhead view of a group of people 70 standing in the detection area 30. Although not illustrated, the tracking system 10 may be present directly above this detection area 30 in order to detect positions of people 70 (and other objects) present within the detection area 30 (e.g., to obtain a plan view of the detection area 30). In the illustrated embodiment, the retro-reflective markers 24 are positioned in a grid pattern 90 on a floor 92 of the detection area 30 (e.g., as a coating, pieces of tape, or similar attachment method). The retro-reflective markers 24 may be arranged in any desired pattern (e.g., grid, diamond, lines, circles, solid coating, etc.), which may be a regular pattern (e.g., repeating) or a random pattern.

This grid pattern 90 may be stored in the memory 22, and portions of the grid pattern 90 (e.g., individual markers 24) may be correlated to locations of certain environmental elements and amusement park features (e.g., the amusement park equipment 12). In this way, the position of each of the markers 24 relative to such elements may be known. Accordingly, when the markers 24 retro-reflect the electromagnetic radiation beam 28 to the detector 16, the location of the markers 24 that are reflecting may be determined and/or monitored by the control unit 18.

As illustrated, when the people 70 or objects 32 are positioned over one or more of the retro-reflective markers 24 on the floor 92, the occluded markers cannot reflect the emitted electromagnetic radiation back to the detector 16 above the floor 92. Indeed, in accordance with an embodiment, the grid pattern 90 may include retro-reflective markers 24 that are spaced apart by a distance that allows the people or objects positioned on the floor 92 to be detectable (e.g., blocking at least one of the retro-reflective markers 24). In other words, the distance between the markers 24 may be sufficiently small so that objects or people may be positioned over at least one of the retro-reflective markers 24.

In operation, the detector 16 may function to detect the electromagnetic radiation beam 28 retro-reflected from the retro-reflective markers 24 that are not covered up by people or objects located in the detection area 30. As discussed above, the detector 16 may then provide data associated with this detection to the control unit 18 for processing. The control unit 18 may perform a comparison of the detected electromagnetic radiation beam reflected off the uncovered retro-reflective markers 24 (e.g., a detected pattern) with stored positions of the completely uncovered grid pattern 90 (e.g., a stored pattern) and/or other known grid patterns resulting from blockage of certain markers 24. Based on this comparison, the control unit 18 may determine which markers 24 are covered to then approximate locations of the people 70 or objects 32 within the plane of the floor 92. Indeed, the use of a grid positioned on the floor 92 in conjunction with a single detector 16 may enable the tracking of movement in two dimensions. If higher order tracking is desired, additional grids and/or additional detectors 16 may be utilized. In certain embodiments, based on the locations of the people 70 or objects 32 in the detection area 30, the control unit 18 may adjust the operation of the amusement park equipment 12.

The process of emitting the electromagnetic radiation beam 28, sensing of the reflected electromagnetic radiation from the uncovered retro-reflective markers 24 on the floor 92, and determining a location of the people 70 may be performed by the control unit 18 numerous times over a short period in order to identify a series of locations of the people 70 moving about the floor 92 (to track motion of the group). Indeed, such procedures may essentially be performed continuously to facilitate identification of a path through which the people 70 have moved within the detection area 30 during a particular timeframe or simply in continuous series. Once the position or path one or more of the people 70 has been detected, the control unit 18 may further analyze the position or path to determine whether any actions should be performed by the equipment 12.

Figure 6:
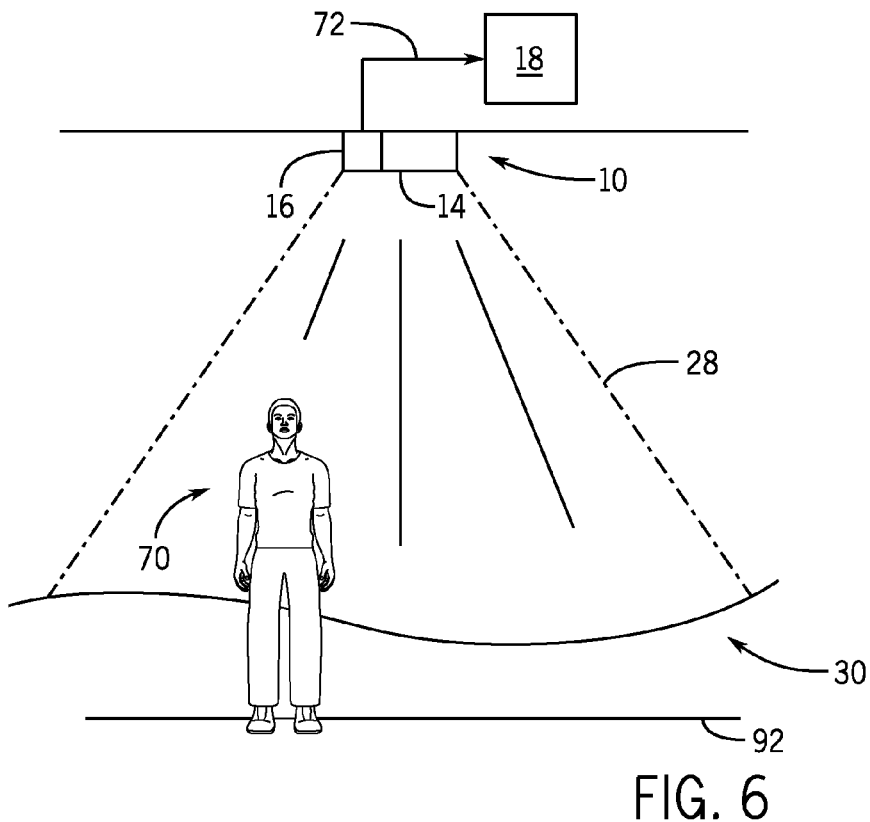
FIG. 6 is an elevational view of the tracking system of FIG. 1 tracking a person without tracking retro-reflective marker movement and without tracking retro-reflective marker occlusion, in accordance with an embodiment of the present disclosure.

As discussed in detail above with respect to FIG. 1, the control unit 18 may be configured to identify certain objects that are expected to cross the path of the electromagnetic radiation beam 28 within the detection area 30, including objects that are not marked with retro-reflective material. For example, as illustrated in FIG. 6, some embodiments of the tracking system 10 may be configured such that the control unit 18 is able to identify the person 70 (which is also intended to be representative of the object 32) located in the detection area 30, without the use of the retro-reflective markers 24. That is, the control unit 18 may receive data indicative of the electromagnetic radiation reflected back from the detection area 30, and the control unit 18 may compare a digital signature of the detected radiation to one or more possible data signatures stored in memory 22. That is, if the signature of electromagnetic radiation reflected back to the detector 16 matches closely enough to the signature of a person 70 or known object 32, then the control unit 18 may determine that the person 70 or object 32 is located in the detection area 30. For example, the control unit 18 may identify "dark spots," or regions where electromagnetic radiation was absorbed rather than reflected, within the detection area 30. These areas may have a geometry that the control unit 18 may analyze (e.g., by comparing to shapes, sizes, or other features of stored objects or people) to identify a presence, location, size, shape, etc., of an object (e.g., the person 70).

As may be appreciated with reference to FIGS. 1, 2, 3, and 6, the tracking system 10 may be positioned in a variety of locations to obtain different views of the detection area 30. Indeed, it is now recognized that different locations and combinations of locations of one or more of the tracking systems 10 (or one or more elements of the tracking system 10, such as multiple detectors 16) may be desirable for obtaining certain types of information relating to the retro-reflective markers 24 and the blockage thereof. For instance, in FIG. 1, the tracking system 10, and in particular the detector 16, is positioned to obtain an elevational view of at least the object 26 fitted with the retro-reflective marker 24 and the object 32. In FIG. 2, the detector 16 is positioned to obtain an overhead perspective view of the detection area 30, which enables detection of retro-reflective markers 24 positioned on a variety of environmental elements, moving objects, or people. In the embodiments of FIGS. 3 and 6, the detector 16 may be positioned to obtain a plan view of the detection area 30.

These different views may provide information that may be utilized by the control unit 18 for specific types of analyses and, in certain embodiments, control actions that may depend on the particular setting in which they are located. For example, in FIG. 7, the tracking system 10, and particularly the emitter 14 and the detector 16, are positioned to obtain a perspective view of the person 70 (or object 32) in the detection area 30. The detection area 30 includes the floor 92, but also includes a wall 93 on which the retro-reflective markers 24 are positioned to form the grid pattern 90. Here, the person 70 is blocking a subset of markers 24 positioned on the wall 93. The subset of markers 24 are unable to be illuminated by the emitter 14, are unable to retro-reflect the electromagnetic radiation back to the detector 16, or both, because the person 70 (also intended to represent an object) is positioned between the subset of markers 24 and the emitter 14 and/or detector 16.

The grid pattern 90 on the wall 93 may provide information not necessarily available from a plan view as shown in FIGS. 3 and 6. For example, the blockage of the retro-reflective markers 24 enables the control unit 18 to determine a height of the person 70, a profile of the person 70, or, in embodiments where there the object 32 is present, a size of the object 32, a profile of the object 32, and so forth. Such determinations may be made by the control unit 18 to evaluate whether the person 70 meets a height requirement for a ride, to evaluate whether the person 70 is associated with one or more objects 32 (e.g., bags, strollers), and may also be used to track movement of the person 70 or object 32 through the detection area 30 with a greater degree of accuracy compared to the plan view set forth in FIGS. 3 and 6. That is, the control unit 18 is better able to tie movement identified by blockage of the markers 24 to a particular person 70 by determining the person's profile, height, etc. Similarly, the control unit 18 is better able to track the movement of the object 32 through the detection area 30 by identifying the geometry of the object 32, and tying identified movement specifically to the object 32. In certain embodiments, tracking the height or profile of the person 70 may be performed by the tracking system 10 to enable the control unit 18 to provide recommendations to the person 70 based on an analysis of the person's evaluated height, profile, etc. Similar determinations and recommendations may be provided for objects 32, such as vehicles. For example, the control unit 18 may analyze a profile of guests at an entrance to a queue area for a ride. The control unit 18 may compare the overall size, height, etc., of the person 70 with ride specifications to warn individuals or provide a confirmation that they are able to ride the ride before spending time in the queue. Similarly, the control unit 18 may analyze the overall size, length, height, etc., of a vehicle to provide parking recommendations based on available space. Additionally or alternatively, the control unit 18 may analyze the overall size, profile, etc., of an automated piece of equipment before allowing the equipment to perform a particular task (e.g., movement through a crowd of people).

The pattern 90 may also be positioned on both the wall 93 and the floor 92. Accordingly, the tracking system 10 may be able to receive retro-reflected electromagnetic radiation from markers 24 on the wall 93 and the floor 92, thereby enabling detection of marker blockage and monitoring of movement in three dimensions. Specifically, the wall 93 may provide information in a height direction 94, while the floor 92 may provide information in a depth direction 96. Information from both the height direction 94 and the depth direction 96 may be correlated to one another using information from a width direction 98, which is available from both the plan and elevational views.

Indeed, it is now recognized that if two objects 32 or people 70 overlap in the width direction 98, they may be at least partially resolved from one another using information obtained from the depth direction 96. Further, it is also now recognized that the use of multiple emitters 14 and detectors 16 in different positions (e.g., different positions in the width direction 98) may enable resolution of height and profile information when certain information may be lost or not easily resolved when only one emitter 14 and detector 16 are present. More specifically, using only one emitter 14 and detector 16 may result in a loss of certain information if there is overlap between objects 32 or people 70 in the width direction 98 (or, more generally, overlap in a direction between the markers 24 on the wall 93 and the detector 16). However, embodiments using multiple (e.g., at least two) detectors 16 and/or emitters 14 may cause distinct retro-reflective patterns to be produced by the markers 24 and observed from the detectors 16 and/or emitters 14 positioned at different perspectives. Indeed, because the markers 24 are retro-reflective, they will retro-reflect electromagnetic radiation back toward the electromagnetic radiation source, even when multiple sources emit at substantially the same time. Thus, electromagnetic radiation emitted from a first of the emitters 14 from a first perspective will be retro-reflected back toward the first of the emitters 14 by the markers 24, while electromagnetic radiation emitted from a second of the emitters 14 at a second perspective will be retro-reflected back toward the second of the emitters 14 by the markers 24, which enables multiple sets of tracking information to be produced and monitored by the control unit 18.

It is also now recognized that the retro-reflective markers 24 on the wall 93 and the floor 92 may be the same, or different. Indeed, the tracking system 10 may be configured to determine which electromagnetic radiation was reflected from the wall 93 versus which electromagnetic radiation was reflected from the floor 92 using a directionality of the retro-reflected electromagnetic radiation from the wall 93 and the floor 92. In other embodiments, different materials may be used for the markers 24 so that, for example, different wavelengths of electromagnetic radiation may be reflected back toward the emitter 14 and detector 16 by the different materials. As an example, the retro-reflective markers 24 on the floor 92 and the wall 93 may have the same retro-reflective elements, but different layers that act to filter or otherwise absorb portions of the emitted electromagnetic radiation so that electromagnetic radiation reflected by the retro-reflective markers 24 on the floor 92 and wall 93 have characteristic and different wavelengths. Because the different wavelengths would be retro-reflected, the detector 16 may detect these wavelengths and separate them from ambient electromagnetic radiation, which is filtered by filter elements within the detector 16.

Figure 8:
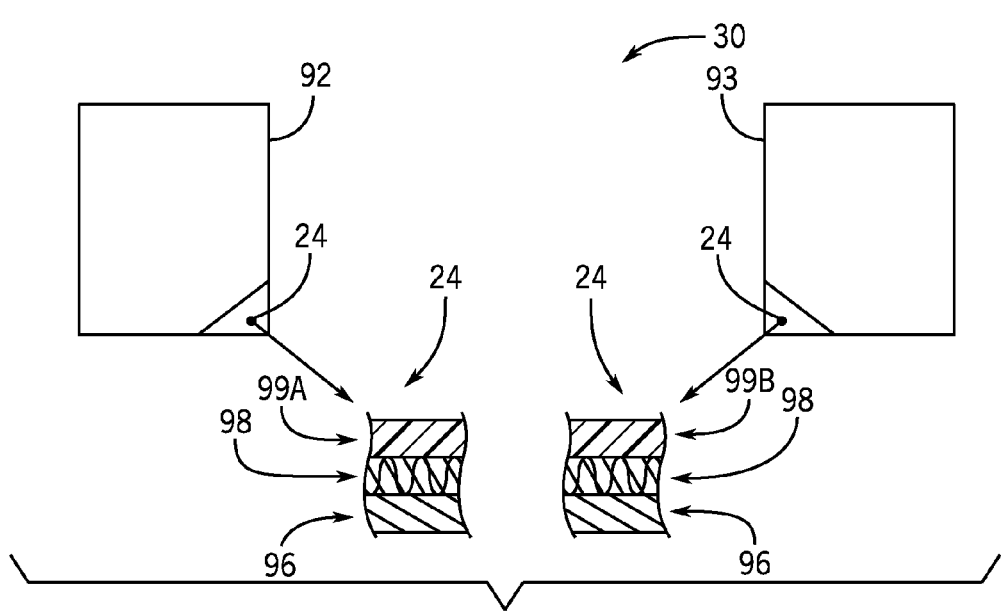
FIG. 8 illustrates cross-sections of retro-reflective markers having different coatings to enable different wavelengths of electromagnetic radiation to be reflected back toward the detector of the tracking system of FIG. 1, in accordance with an embodiment of the present disclosure.

To help illustrate, FIG. 8 depicts expanded cross-sectional views of example retro-reflective markers 24 disposed on the floor 92 and the wall 93 within the detection area 30. The markers 24 on the floor 92 and the wall 93 each include a reflective layer 96 and a retro-reflective material layer 98, which may be the same or different for the floor 92 and wall 93. In the illustrated embodiment, they are the same. During operation, electromagnetic radiation emitted by the emitter 14 may traverse a transmissive coating 99 before striking the retro-reflective material layer 98. Accordingly, the transmissive coating 99 may be used to adjust the wavelengths of electromagnetic radiation that are retro-reflected by the markers. In FIG. 8, the markers 24 on the floor 92 include a first transmissive coating 99A, which is different than a second transmissive coating 99B in the markers 24 on the wall 93. In certain embodiments, different optical properties between the first and second transmissive coatings 99A, 99B may cause a different bandwidth of electromagnetic radiation to be reflected by the markers 24 on the floor 92 and the markers 24 on the wall 93. While presented in the context of being disposed on the floor 92 and the wall 93, it should be noted that markers 24 having different optical properties may be used on a variety of different elements within the amusement park, such as on people and environmental elements, people and moving equipment, and so on, to facilitate separation for processing and monitoring by the control unit 18.

Any one or a combination of the techniques set forth above may be used to monitor a single object or person, or multiple objects or people. Indeed, it is presently recognized that a combination of multiple retro-reflective marker grids (e.g., on the floor 92 and wall 93 as set forth above), or a combination of one or more retro-reflective marker grids and one or more tracked retro-reflective markers 24 fixed on a movable object or person, may be utilized to enable three-dimensional tracking, even when only one detector 16 is utilized. Further, it is also recognized that using multiple retro-reflective markers 24 on the same person or object may enable the tracking system 10 to track both position and orientation.

In this regard, FIG. 9A illustrates an embodiment of the object 26 having multiple retro-reflective markers 24 positioned on different faces of the object 26. Specifically, in the illustrated embodiment, the retro-reflective markers 24 are disposed on three different points of the object 26 corresponding to three orthogonal directions (e.g., X, Y, and Z axes) of the object 26. However, it should be noted that other placements of the multiple retro-reflective markers 24 may be used in other embodiments. In addition, the tracking depicted in FIG. 9A may be performed as generally illustrated, or may also utilize a grid of the retro-reflective markers 24 as shown in FIG. 7.

As noted above, the tracking system 10 may include multiple detectors 16 configured to sense the electromagnetic radiation that is reflected back from the object 26, for example. Each of the retro-reflective markers 24 disposed on the object 26 may retro-reflect the emitted electromagnetic radiation beam 28 at a particular, predetermined frequency of the electromagnetic spectrum of the electromagnetic radiation beam 28. That is, the retro-reflective markers 24 may retro-reflect the same or different portions of the electromagnetic spectrum, as generally set forth above with respect to FIG. 8.

The control unit 18 is configured to detect and distinguish the electromagnetic radiation reflected at these particular frequencies and, thus, to track the motion of each of the separate retro-reflective markers 24. Specifically, the control unit 18 may analyze the detected locations of the separate retro-reflective markers 24 to track the roll (e.g., rotation about the Y axis), pitch (e.g., rotation about the X axis), and yaw (e.g., rotation about the Z axis) of the object 26. That is, instead of only determining the location of the object 26 in space relative to a particular coordinate system (e.g., defined by the detection area 30 or the detector 16), the control unit 18 may determine the orientation of the object 26 within the coordinate system, which enables the control unit 18 to perform enhanced tracking and analyses of the movement of the object 26 in space and time through the detection area 30. For instance, the control unit 18 may perform predictive analyses to estimate a future position of the object 26 within the detection area 30, which may enable enhanced control over the movement of the object 26 (e.g., to avoid collisions, to take a particular path through an area).

In certain embodiments, such as when the object 26 is a motorized object, the tracking system 10 may track the position and orientation of the object 26 (e.g., a ride vehicle, an automaton, an unmanned aerial vehicle) and control the object 26 to proceed along a path in a predetermined manner. The control unit 18 may, additionally or alternatively, compare the results to an expected position and orientation of the object 26, for example to determine whether the object 26 should be controlled to adjust its operation, and/or to determine whether the object 26 is operating properly or is in need of some sort of maintenance. In addition, the estimated position and orientation of the object 26, as determined via the tracking system 10, may be used to trigger actions (including preventing certain actions) by other amusement park equipment 12 (e.g., show effects). As one example, the object 26 may be a ride vehicle and the amusement park equipment 12 may be a show effect. In this example, it may be desirable to only trigger the amusement park equipment 12 when the object 26 is in the expected position and/or orientation.

Continuing with the manner in which tracking in three spatial dimensions may be preformed, FIG. 9B depicts an example of the object having a first marker 24A, a second marker 24B, and a third marker 24C positioned in similar positions as set forth in FIG. 9A. However, from the perspective of a single one of the detectors 16, the detector 16 may see a two-dimensional representation of the object 16, and the markers 24A, 24B, 24C. From this first perspective (e.g., overhead or bottom view), the control unit 18 may determine that the first and second markers 24A, 24B are separated by a first observed distance d1, the first and third markers 24A, 24C are separated by a second observed distance d2, and the second and third markers 24B, 24C are separated by a third observed distance d3. The control unit 18 may compare these distances to known or calibrated values to estimate an orientation of the object 26 in three spatial dimensions.

Moving to FIG. 9C, as the object 26 rotates, the detector 16 (and, correspondingly, the control unit 18) may detect that the apparent shape of the object 26 is different. However, the control unit 18 may also determine that the first and second markers 24A, 24B are separated by an adjusted first observed distance d1', the first and third markers 24A, 24C are separated by an adjusted second observed distance d2', and the second and third markers 24B, 24C are separated by an adjusted third observed distance d3'. The control unit 18 may determine a difference between the distances detected in the orientation in FIG. 9B and the distances detected in the orientation in FIG. 9C to determine how the orientation of the object 26 has changed to then determine the orientation of the object 26. Additionally or alternatively, the control unit 18 may compare the adjusted observed distances d1', d2', d3' resulting from rotation of the object 26 to stored values to estimate an orientation of the object 26 in three spatial dimensions, or to further refine an update to the orientation determined based on the change between the distances in FIGS. 9B and 9C.

As set forth above, present embodiments are directed to, among other things, the use of the disclosed tracking system 10 to track objects and/or people within an amusement park environment. As a result of this tracking, the control unit 18 may, in some embodiments, cause certain automated functions to be performed within various subsystems of the amusement park. Accordingly, having described the general operation of the disclosed tracking system 10, more specific embodiments of tracking and control operations are provided below to facilitate a better understanding of certain aspects of the present disclosure.

Figure 10:
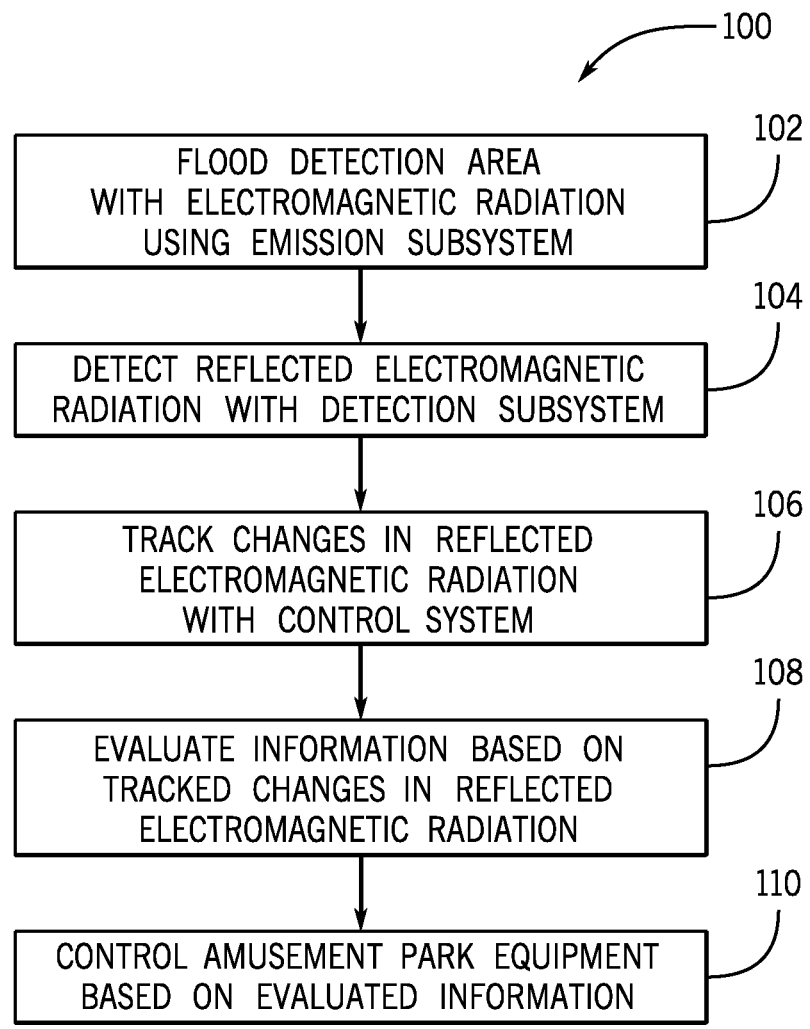
FIG. 10 is a flow diagram illustrating an embodiment of a method of tracking reflection and controlling amusement park elements based on the tracked reflection using the tracking system of FIG. 1, in accordance with an embodiment of the present disclosure.

Moving now to FIG. 10, an embodiment of a method 100 of monitoring changes in reflected electromagnetic radiation to track movement of a target and control amusement park equipment as result of this monitoring is illustrated as a flow diagram. Specifically, the method 100 includes the use of one or more of the emitters 14 (e.g., an emission subsystem) to flood (block 102) the detection area 30 with electromagnetic radiation (e.g., electromagnetic radiation beam 28) using the emission subsystem. For instance, the control unit 18 may cause one or more of the emitters 14 to intermittently or substantially continuously flood the detection area 30 with emitted electromagnetic radiation. Again, the electromagnetic radiation may be any appropriate wavelength that is able to be retro-reflected by the retro-reflective markers 24. This includes, but is not limited to, ultraviolet, infrared, and visible wavelengths of the electromagnetic spectrum. It will be appreciated that different emitters 14, and in some embodiments, different markers 24, may utilize different wavelengths of electromagnetic radiation to facilitate differentiation of various elements within the area 30.

After flooding the detection area 30 with electromagnetic radiation in accordance with the acts generally represented by block 102, the method 100 proceeds to detecting (block 104) electromagnetic radiation that has been reflected from one or more elements in the detection area 30 (e.g., the retro-reflective markers 24). The detection may be performed by one or more of the detectors 16, which may be positioned relative to the emitter 14 as generally set forth above with respect to FIGS. 1 and 2. As described above and set forth in further detail below, the features that perform the detection may be any appropriate element capable of and specifically configured to capture retro-reflected electromagnetic radiation and cause the captured retro-reflective electromagnetic radiation to be correlated to a region of the detector 16 so that information transmitted from the detector 16 to the control unit 18 retains position information regarding which of the markers 24 reflected electromagnetic radiation to the detector 16. As one specific but non-limiting example, one or more of the detectors 16 (e.g., present as a detection subsystem) may include charge coupled devices within an optical camera or similar feature.

As described above, during the course of operation of the tracking system 10, and while people 70 and/or objects 26, 32 are present within the detection area 30, it may be expected that changes in reflected electromagnetic radiation will occur. These changes may be tracked (block 106) using a combination of the one or more detectors 16 and routines performed by processing circuitry of the control unit 18. As one example, tracking changes in the reflected electromagnetic radiation in accordance with the acts generally represented by block 106 may include monitoring changes in reflected patterns from a grid over a certain period of time, monitoring changes in spectral signatures potentially caused by certain absorptive and/or diffusively or specularly reflective elements present within the detection area 30, or by monitoring certain moving retro-reflective elements. As described below, the control unit 18 may be configured to perform certain types of tracking of the changes in reflection depending on the nature of the control to be performed in a particular amusement park attraction environment.

At substantially the same time or shortly after tracking the changes in reflected electromagnetic radiation in accordance with the acts generally represented by block 106, certain information may be evaluated (block 108) as a result of these changes by the control unit 18. In accordance with one aspect of the present disclosure, the evaluated information may include information pertaining to one or more individuals (e.g., amusement park guests, amusement park employees) to enable the control unit 18 to monitor movement and positioning of various individuals, and/or make determinations relating to whether the person is appropriately positioned relative to certain amusement park features. In accordance with another aspect of the present disclosure, the information evaluated by the control unit 18 may include information relating to objects 26, 32, which may be environmental objects, moving objects, the amusement park equipment 12, or any other device, item, or other feature present within the detection area 30. Further details regarding the manner in which information may be evaluated is described in further detail below with reference to specific examples of amusement park equipment controlled at least in part by the control unit 18.

As illustrated, the method 100 also includes controlling (block 110) amusement park equipment based on the information (e.g., monitored and analyzed movement of people and/or objects) evaluated in accordance with acts generally represented by block 108. It should be noted that this control may be performed in conjunction with concurrent tracking and evaluation to enable the control unit 18 to perform many of the steps set forth in method 100 on a substantially continuous basis and in real-time (e.g., on the order of the rate of capture of the detector 16), as appropriate. In addition, the amusement park equipment controlled in accordance with the acts generally represented by block 110 may include automated equipment such as ride vehicles, access gates, point-of-sale kiosks, informational displays, or any other actuatable amusement park device. As another example, the control unit 18 may control certain show effects such as the ignition of a flame or a firework as a result of the tracking and evaluation performed in accordance with method 100. More details relating to certain of these specific examples are described in further detail below.

In accordance with a more particular aspect of the present disclosure, the present embodiments relate to the monitoring of vehicles in and within the immediate vicinity of an amusement park attraction area, and controlling park equipment based on this information. The amusement park equipment controlled in accordance with present embodiments may include, by way of example, access gates, lights, cameras, textual indicators, and so forth.

Figure 11:
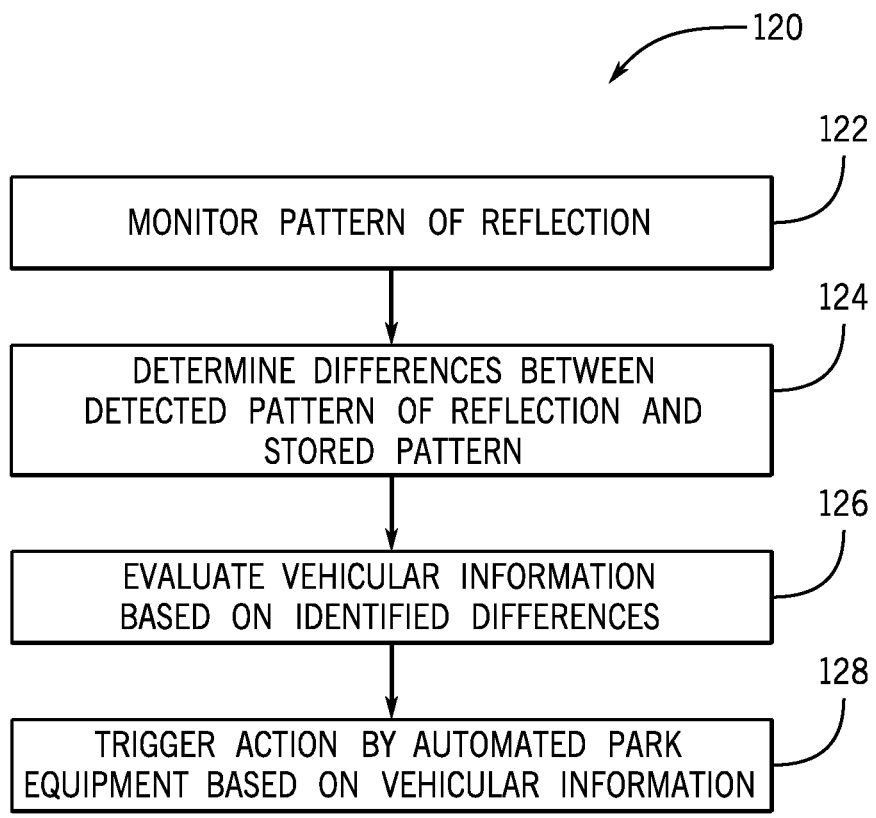
FIG. 11 is a flow diagram illustrating an embodiment of a method of tracking reflection to evaluate vehicle information and controlling amusement park elements based on the evaluated information using the tracking system of FIG. 1, in accordance with an embodiment of the present disclosure.

In accordance with this aspect, FIG. 11 illustrates an embodiment of a method 120 for monitoring patterns of reflection and controlling automated amusement park equipment as a result of monitoring vehicles within and around an amusement park area. As illustrated, the method 120 includes monitoring (block 122) a pattern of reflection. The monitoring performed in accordance with the acts generally represented by block 122 may be considered to be performed using the tracking system 10, either alone or in combination with other features of an amusement park control system. To facilitate discussion, the disclosure set forth below may refer to a control system that is communicatively coupled to a number of different devices including the tracking system 10, as well as the amusement park equipment to be controlled.

Monitoring the pattern of reflection in accordance with block 122 may include monitoring a number of different features in the manner described above with respect to FIGS. 3-9. Accordingly, the monitoring performed in accordance with block 122 may include monitoring a pattern generated over time by a marker being tracked within the detection area 30, or may include monitoring a pattern of reflection generated at any one time instance by a plurality of retro-reflective markers 24 positioned within the detection area 30. Further still, the monitoring performed in accordance with block 122 may not involve the use of the markers 24, such as in situations where the tracking system 10 is employed to track specular and/or diffuse reflection, or retro-reflection from certain inherently retro-reflective elements associated with a vehicle.

In some embodiments, a combination of reflective patterns may be monitored in accordance with block 122, for example when one or more of the retro-reflective markers 24 is positioned on a vehicle, while other retro-reflective markers 24 are positioned on other objects 32, the wall 93, the floor 92, or any other environmental feature in the detection area 30. Further, combinations of retro-reflective elements and retro-reflective markers 24 may be monitored and utilized to determine different types of information.

The method 120 may also include determining (block 124) differences between detected patterns of reflection and stored patterns of reflection. For example, a detected pattern may be considered to be a pattern generated either at any one instance (e.g. using a grid) or over time by a single or multiple tracked retro-reflective markers 24 (and/or retro-reflective elements). The stored patterns may be considered to represent patterns stored in the memory 22 of the control unit 18, which may be correlated to different types of information, such as vehicle size and/or shape information, certain types of movement or locations, certain types of access associated with vehicles, vehicle positioning, or the like. In one embodiment, the control unit 18 may determine differences between the detected pattern of reflection and the stored pattern of reflection to further determine whether the detected pattern correlates to a particular control action associated with the stored pattern. Alternatively or additionally, the comparison may output information that is used for subsequent determinations, as described in further detail below.

The method 120 may also include evaluating (block 126) vehicle information based on identified differences (which also provides similarity information) between the monitored pattern and stored patterns. As an example, a vehicle may include curved, shiny, translucent, or mirrored elements that may enable certain types of reflection. Indeed, vehicles are often fitted with certain retro-reflective elements that are illuminated by the lights of other vehicles to facilitate safe driving at night. The present embodiments of the tracking system 10 may utilize these retro-reflective elements to track and evaluate information about the vehicles 172 to facilitate automated control of various amusement park equipment. For example, the tracking system 10 may determine vehicle size (e.g., by determining a distance between retro-reflective turn signal housings of the vehicle), vehicle shape (e.g., by determining a pattern of reflection associated with one or more turn signals, tail lights, and/or headlights), and so forth, and compare this determined pattern of reflection to a stored pattern associated with a known vehicle make and model. Accordingly, evaluating the vehicle information may include determining information about the vehicle using the monitored reflection. Further, combinations of evaluations may be performed. For example, retro-reflective elements that are a part of the vehicle (e.g., turn signal reflectors, headlight reflectors, tail light reflectors) may be used to evaluate the size and shape of the vehicle, while a retro-reflective marker 24 attached to the vehicle (e.g. upon purchase of a parking pass) may be monitored to evaluate where the vehicle is authorized to go.

The method 120 may also include using the evaluated vehicle information to cause triggering (including preventing actions of) of automated park equipment (block 128). For example, evaluated vehicle information may cause the control unit 18 to trigger a user-perceivable indication (e.g., the illumination of one more lights, to cause a display to provide a parking recommendation), to automatically dispatch assistance to a disabled vehicle, or similar actions.

Figure 12:
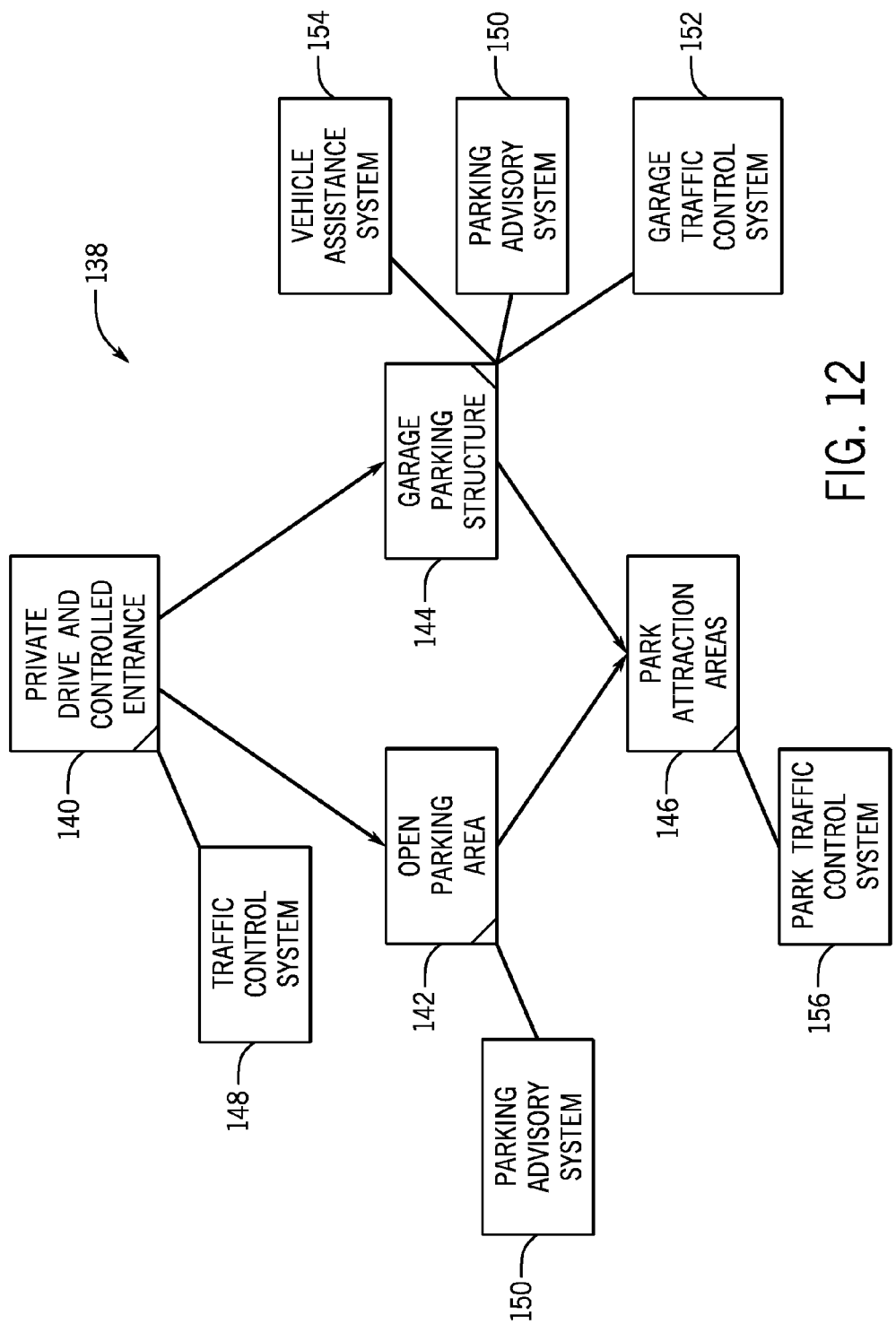
FIG. 12 is a schematic view of an amusement park area that utilizes the tracking system to monitor vehicle information at intersections and parking structures and control amusement park elements based on the vehicle information to affect vehicle movement and position, in accordance with an embodiment of the present disclosure.

FIG. 12 schematically illustrates an embodiment of an amusement park area 138 that utilizes the disclosed tracking system 10 in accordance with one or more aspects of the method 120 described above. More specifically, the disclosed tracking system 10 may be used in different parts of the amusement park area 138 where vehicles may be driven by guests and/or park employees, such as in areas within and connected to a private drive and controlled entrance 140. Such areas may include, as shown, an open parking area 142, a garage parking structure 144, and park attraction areas 146 that are connected to the private drive and controlled entrance 140 via certain pathways (e.g., vehicle paths and/or walking paths).

By way of non-limiting example, the disclosed tracking system 10 may be used as part of a traffic control system 148 utilized in the private drive and controlled entrance 140. The traffic control system 148, as described in further detail below, may utilize the disclosed tracking system 10 to control traffic at intersections between streets or vehicle pathways, for example by directing traffic based on monitored vehicle movement (e.g., using a user-perceivable indication such as a light, or graphical or textual information). As another example, the open parking area 142 may include a parking advisory system 150 that utilizes the disclosed tracking system 10 to provide recommendations regarding parking and to assist in the parking of vehicles within certain parking spaces.

The garage parking structure 144 may also utilize the tracking system 10 in a variety of systems. As illustrated in FIG. 12, the garage parking structure 144 may include an embodiment of the parking advisory system 150, as well as a garage traffic control system 152 and/or a vehicle assistance system 154. As described below, the parking advisory system 150 may be configured to recommend parking spaces, assist guests in parking vehicles within certain spaces, and so forth. The garage traffic control system 152 may, for example, be configured to monitor movement of vehicles through the garage parking structure 144 and may provide warnings or similar information to drivers while to prevent collisions and to provide any other information that may be useful as guests move through the garage parking structure 144. The vehicle assistance system 154 may utilize the disclosed tracking system 10 to recognize situations where guests may need assistance with their vehicle. Such a situation may occur, for example, if the guest is away and returns to find that their vehicle will not start or otherwise has trouble. For instance, the disclosed tracking system 10 may monitor parking spaces within the garage parking structure 144 for indications that guests may be having vehicle trouble, for example by recognizing indicators of an open hood of the vehicle, or by detecting the presence of a retro-reflective marker with one or more wavelengths specifically correlated to a response of the tracking system 10 that causes the control unit 18 to notify a garage parking attendant that a guest is in need of assistance.

The disclosed tracking system 10 may also be used to control traffic within park attraction areas 146. As shown, the amusement park area 138 may include a park traffic control system 156 integrated within various sections of the park attraction areas 146. As described in further detail below, the park traffic control system 156 may be configured to monitor various pathways through the park attraction areas 146 to control the movement of vehicles relative to guest pathways, for example by providing visual indicators (e.g., using a user-perceivable indication such as a light, or graphical or textual information) to park employees that may be driving a conveyance through the park. The tracking system 10 may also be configured to monitor movement to automatically control the opening of gates within the park to allow access to various service pathways that are separate, but may cross, guest pathways.

As may be appreciated from the foregoing discussion, the amusement park area 138 may include a number of areas that may utilize embodiments of the tracking system 10. In this regard, the discussion presented below describes various embodiments of the manner in which the tracking system 10 may be integrated into the amusement park area 138 as guests progress through the area 138 from the controlled entrance 140 through various parking areas, and to the attraction areas 146.

Figure 13:
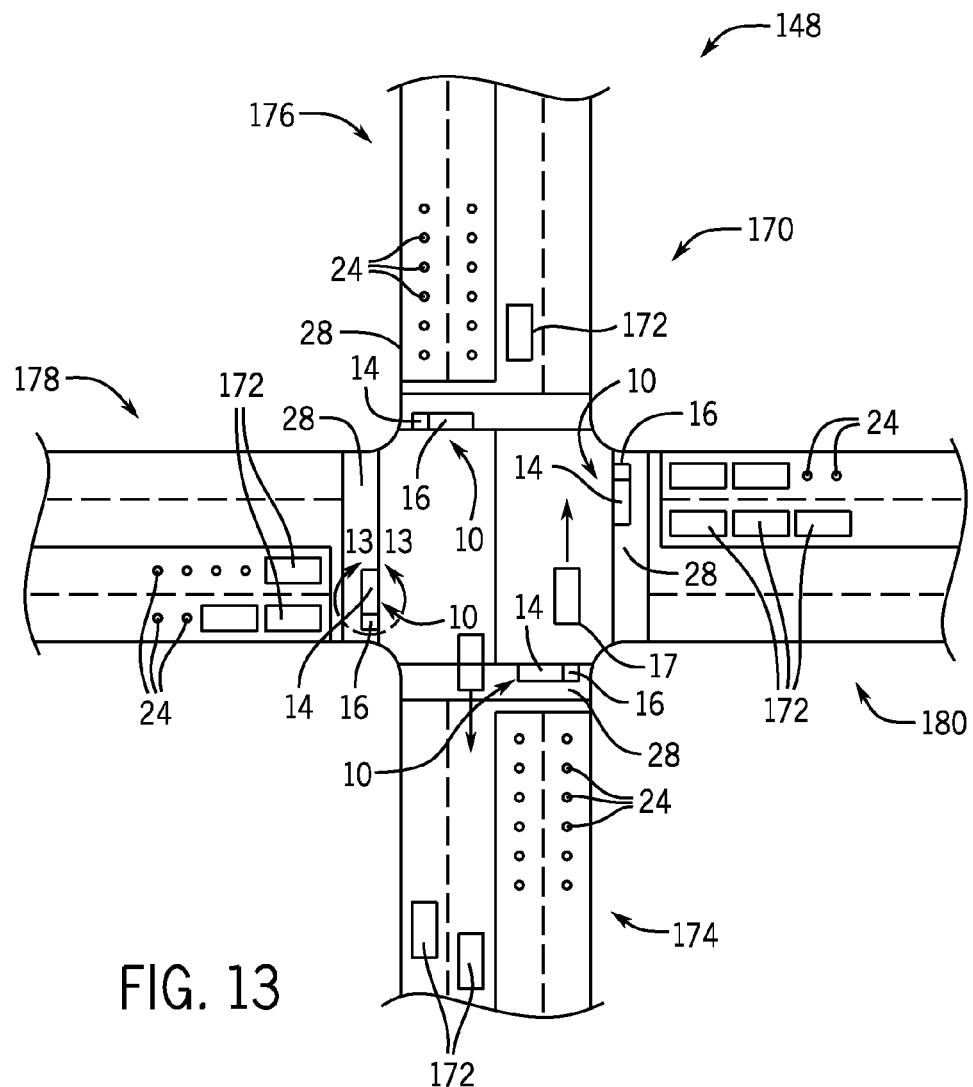
FIG. 13 is an overhead view of a road intersection and an embodiment of the manner in which the tracking system may be integrated into the intersection to control traffic, in accordance with an embodiment of the present disclosure.

As mentioned above, the tracking system 10 may be used for controlling traffic at an intersection. FIG. 13, for example, is an overhead view of one such intersection 170, which may utilize the presently disclosed tracking system 10 to more efficiently direct traffic through the intersection 170. The intersection 170 may represent, for example, an intersection at a roadway outside of the amusement park area 138, vehicle intersections within the amusement park area 138 (e.g., within the private drive and controlled entrance 140), and pathway intersections (e.g., walking pathways and vehicle pathways) within the amusement park area 138 (e.g., at the park attraction areas 146). Indeed, in one aspect, the intersection 170 may represent an implementation of an embodiment of the traffic control system 148 and/or the park traffic control system 156 of FIG. 12.

The illustrated intersection 170 is a four-way intersection with two lanes of traffic in each direction. However, in other embodiments, the intersection 170 may include any number of lanes directing vehicles 172 in any number of directions (e.g., 2, 3, 4, 5, 6, or more). The intersection 170 may include tracking systems 10 disposed over each direction of travel of the intersection 170 (e.g., mounted to or hanging from the same cable that hold the lights used to direct traffic). In other embodiments, however, any desirable number of tracking systems 10 (e.g., one for each lane) may be disposed at any desirable location that provides a clear line of sight to the spaces where the vehicles 172 stop at the intersection 170 (e.g., before the light turns green or some other indication that enables the vehicles 172 to cross). The spaces where the vehicles 172 stop at the intersection 170 may include the retro-reflective markers 24 disposed thereon. In some embodiments, each lane may include a single retro-reflective marker 24, but other embodiments may include a group of retro-reflective markers 24, as illustrated.

The tracking system 10 may emit the electromagnetic radiation beam 28 toward these spaces before the intersection 170, and electromagnetic radiation reflected back from the retro-reflective markers 24 may indicate whether any vehicles 172 are waiting at the intersection 170. For example, in the illustrated embodiment, the vehicles 172 are not waiting to go through the intersection 170 along a first section 174 and a second section 176 of road, the first and second sections 174, 176 being on opposite ends of the intersection 170. More specifically, the detector 16 may detect the electromagnetic radiation reflecting off the retro-reflective markers 24 along these two sections 174, 176. For example, the detector 16 may detect a plurality of changes in a reflective pattern of the retro-reflective markers 24 in the first and second sections 174, 176 over a relatively short time frame (e.g., a matter of seconds, such as changes in reflection that are detected for between approximately 0.1 seconds and approximately 5 seconds), indicating that vehicles 172 are passing over the retro-reflective markers 24 but are not stopped over the markers 24.

On the other hand, several of the illustrated vehicles 172 are waiting to go through the intersection 170 along a third section 178 and a fourth section 180 of road on opposite ends of the intersection 170, which extend in a direction crosswise (e.g., substantially perpendicular) to the first and second sections 174, 176. The detector 16 may not detect any electromagnetic radiation reflecting from the covered retro-reflective markers 24 (e.g., detects a change in reflective patterns from the retro-reflective markers 24 that occurs for a relatively long amount of time, such as greater than 10 seconds), and the control unit 18 may therefore determine that the vehicles 172 are waiting for a green light. As a result of this determination, the control unit 18 may send control signals to lights for the intersection 170 to adjust traffic flow.

Figure 14:
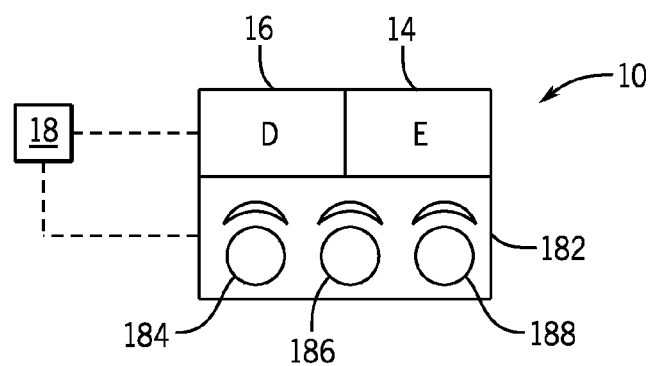
FIG. 14 is an expanded view of the tracking system integrated into a street light associated with the intersection of FIG. 13, in accordance with an embodiment of the present disclosure.

In this regard, as shown in the expanded view of FIG. 14, the tracking system 10 may be integrated with various signage at the intersection 170, such as a traffic light 182 having a first light indicator 184, a second light indicator 186, and a third light indicator 188 (e.g., green, yellow, and red lights). Referring to the example determination by the control unit 18 that vehicles 172 on the third and fourth sections 178, 180 are waiting to proceed through the intersection 170, the control unit 18 may cause the first light indicator 184 (e.g., a red light) to illuminate for the first and second sections 174, 176 (e.g., after the second light indicator 186, for instance a yellow light, has been illuminated for a short time, causing traffic to slow), and cause the third light indicator 188 (e.g., green light) for the third and fourth sections 178, 180 to illuminate. In this way, the tracking system 10 may increase the efficiency of traffic signals at intersections 170. Although the illustrated embodiment includes the retro-reflective markers 24 on the spaces of the sections 174, 176, 178, 180, other embodiments of the tracking system 10 may be configured to identify the vehicles 172 waiting at the intersection 170 based on a comparison with a predetermined and stored signature of electromagnetic radiation reflected from the vehicle 172. In addition, the tracking system 10 may be configured to detect several different kinds of vehicles 172 (e.g., based on retro-reflective markers 24 or a detected vehicle signature), such as motorcycles, cars, trucks, trailers, or any other vehicle 172 that may be stopped at the intersection 170. Indeed, the tracking system 10 may be configured to detect retro-reflection from tags issued by governmental agencies, for instance license plate tags or windshield tags. Thus, the presently disclosed tracking system 10 may provide a more robust method for tracking the vehicles 172 at the intersection 170, since the retro-reflective markers 24 (or other retro-reflective materials) may not be washed out in the sunlight.

As guests enter the amusement park area 138 via the private drive and controlled entrance 140, they may be presented with a number of options for parking, depending on the various park attractions that they are considering visiting, where they might be staying in relation to the location of the amusement park area 138, and so forth. In this regard, guests may have purchased, or be presented with an option to purchase specific types of parking for their vehicles 172. In certain embodiments, the tracking system 10 may be configured to recognize a tag or similar feature associated with a parking purchase, as described below. For example, in certain embodiments, the private drive and controlled entrance 140 may enable the guest vehicle 172 to access either or both of the open parking area 142 or the garage parking structure 144, depending on various identifying information relating to the vehicle 172.

Figure 15:
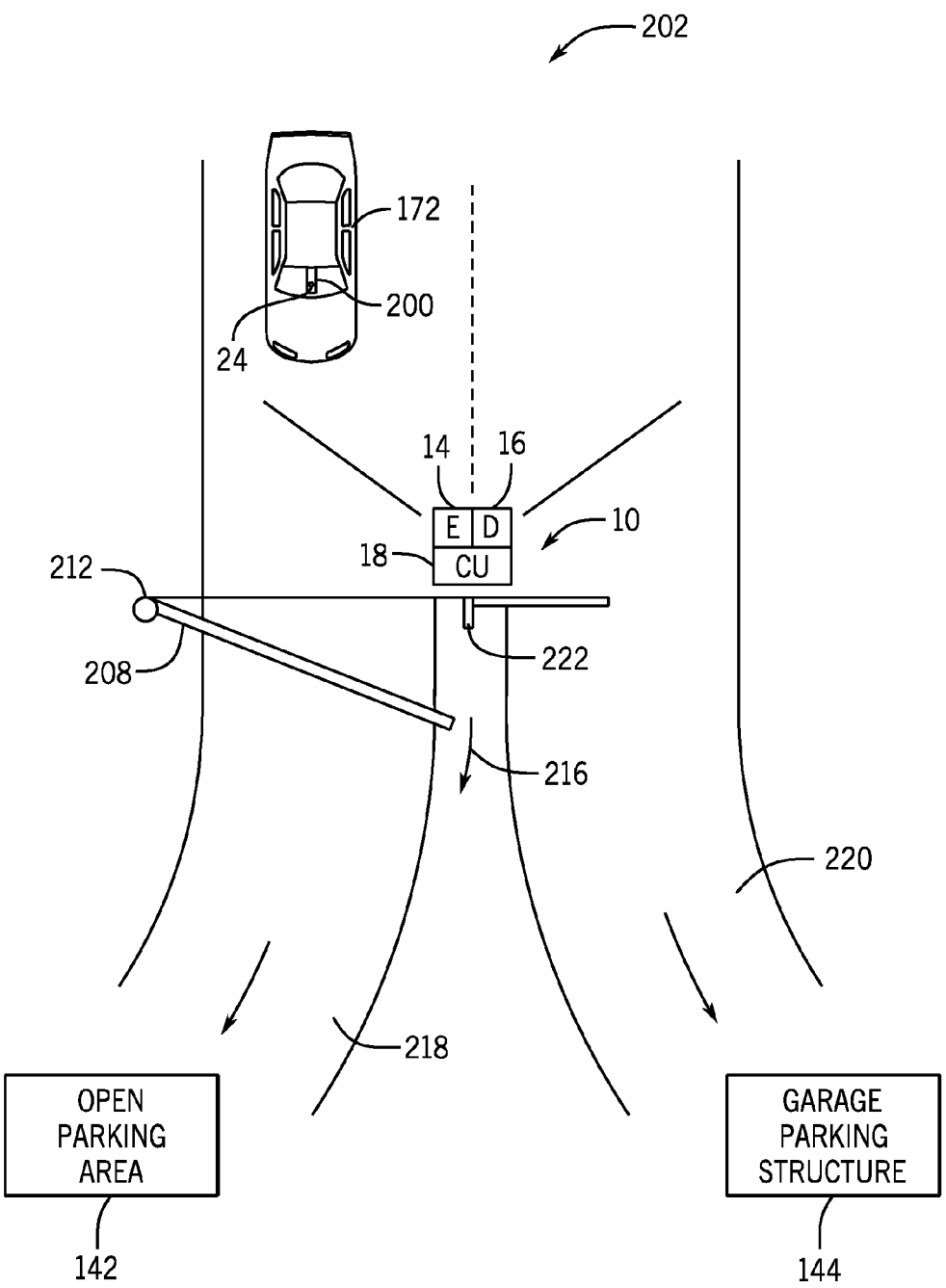
FIG. 15 is an overhead view of the tracking system integrated into a an entrance system that controls whether a vehicle is directed to open parking or garage parking, in accordance with an embodiment of the present disclosure.

As shown in FIG. 15, for example, the vehicle 172 may be fitted with a vehicle tag 200, which may include one or more of the retro-reflective markers 24. The vehicle tag 200 may be a hang tag that is attached to a rear view mirror, a sticker fixed to a windshield of the vehicle 172, or similar feature. As the vehicle 172 progresses through the amusement park area 138, for example driving through the controlled entrance 140, the vehicle 172 may encounter an embodiment of an entrance system 202 having the tracking system 10 configured to recognize certain types of vehicle tags 200 based on the particular wavelengths of electromagnetic radiation retro-reflected by one or more of the markers 24. The entrance system 202 may be considered to represent a particular embodiment of the traffic control system 148 configured to direct vehicle traffic to different areas through the amusement park area 138.

As illustrated, the vehicle 172 may travel along an entrance pathway 204 and encounter a controlled access gate 206 of the entrance system 202. The controlled access gate 206 may include, as illustrated and by way of example, a first movable gate 208 and a second movable gate 210, which are each connected to respective gate activation devices 212, 214 (i.e., first gate activation device 212 and second gate activation device 214, respectively). The gate activation devices 212, 214 are configured to move their respective movable gates 208, 210 to allow the vehicle 172 to pass through to the open parking area 142 or the garage parking structure 144, as described below.

The gate activation devices 212, 214 may be directly or indirectly communicatively coupled to the control unit 18 of the tracking system 10 (or other features of an amusement park control system communicatively coupled to the control unit 18). The tracking system 10, as described below, may control the operation of the gate activation devices 212, 214 in response to monitoring retro-reflection from the entrance pathway 204. Accordingly, the entrance pathway 204, and specifically a portion of the pathway 204 proximate the access control gate 206, may be considered to be the detection area 30 of the tracking system 10. The emitter of the system 10 emits the electromagnetic radiation beam 28 into the entrance pathway 204, thereby illuminating the vehicle tag 200, and specifically any retro-reflective materials, such as the retro-reflective marker 24, present on the tag 200. The detector 16, upon receipt of retro-reflected electromagnetic radiation from the vehicle tag 200, may send signals indicative of the particular wavelengths received for processing by the control unit 18. Accordingly, the control unit 18 may evaluate the retro-reflected electromagnetic radiation and determine, based on various analyses associated with the detected wavelengths, which of the first or second movable gates 208, 210 to open.

As illustrated, the control unit 18 has determined, based on retro-reflected electromagnetic radiation from the vehicle tag 200, that the first movable gate 208 should be opened. As generally shown by arrow 216, the control unit 18 has provided appropriate control signals to the first gate activation device 212 to cause the first movable gate 208 to open to a first entrance path 218 that leads to the open parking area 142. In other embodiments, the control unit 18 may determine that the vehicle tag 200 retro-reflects electromagnetic radiation in a way that indicates that the control unit 18 should open the second movable gate 210 so that the vehicle 172 may access a second entrance path 220 leading to the garage parking structure 144.

It should be noted that the tracking system 10 may not necessarily be directly communicatively coupled to various elements of the traffic control system 148. Rather, as shown, the control unit 18 may be in direct or indirect communication with a gate controller 222. The gate controller 222 may include associated processing circuitry that stores instructions associated with control actions specific to the gates 208, 210 and/or information relating to wavelengths of retro-reflection associated with these control actions. Accordingly, determinations based on the receipt of retro-reflected electromagnetic radiation by the tracking system 10 may be performed by the tracking system 10 itself, or by other features in communication with the tracking system 10. By way of example, the control unit 18 may include specific code or another implementation of gate actuation and control, or may simply send raw or minimally processed data to the gate controller 222, which may in turn cause either of the gates 208, 210 to be opened by gate activation devices 212, 214 based on various comparisons between identified wavelengths and stored wavelengths associated with the opening of either of the gates 208, 210.

The gate controller 222 may also be communicatively coupled with various kiosks or other ticketing systems, which may enable the gate controller 222 to determine whether the vehicle tag 200 is associated with the purchase of a parking space in the open parking area 142 for the garage parking structure 144 (e.g., based on an optical property of the retro-reflective marker 24). For instance, the gate controller 222 (or the control unit 18) may compare the detected wavelengths from the vehicle tag 200 to the stored values associated with particular parking purchases, and may open either of the gates 208, 210 accordingly.

Figure 16:
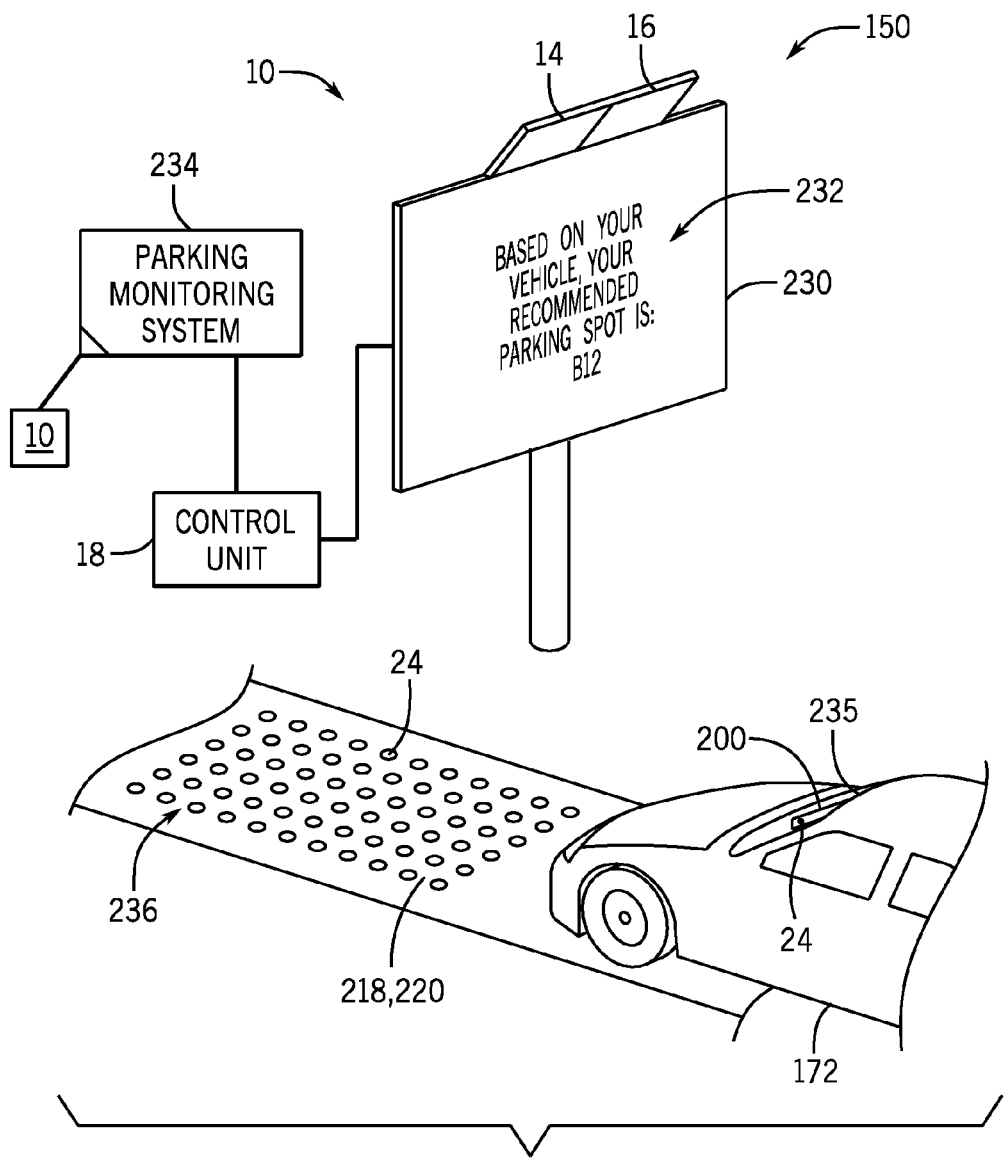
FIG. 16 is a perspective view of a parking advisory system utilizing the tracking system to evaluate information about a vehicle and provide a parking recommendation based on the evaluation, in accordance with an embodiment of the present disclosure.

As the guests proceed down or through the entrance pathway 204, and into either of the first or second entrance paths 218, 220, the vehicle 172 and associated guests may be provided with a recommendation for parking by the parking advisory system 150 of the open parking area 142 or the garage parking structure 144. FIG. 16 depicts an embodiment of the parking advisory system 150 including an electronic display 230 and an embodiment of the tracking system 10. More specifically, the illustrated electronic display 230 is positioned on the ground proximate the first or second entrance paths 218, 220 in a position where the display 230 is viewable from the vehicle 172 (e.g., as the vehicle travels toward either of the open parking area 142 or the garage parking structure 144) to provide a user-perceivable indication such as a light, or graphical or textual information. However, in other embodiments, the electronic display 230 may be a part of a mobile device, such as a mobile phone, a tablet, a global positioning system (GPS), and so forth, configured to communicate with control circuitry of the amusement park, such as the circuitry of one or more of the tracking systems 10 (e.g., implemented as part of the parking advisory system 150 or another monitoring system). The illustrated parking advisory system 150 utilizes an embodiment of the emitter 14 and the detector 16 positioned proximate (e.g. on top of) the display 230, which may enable the emitter 14 to cause the vehicle tag 200 to retro-reflect electromagnetic radiation that is subsequently received by the detector 16. The retro-reflected electromagnetic radiation may be indicative of various aspects of the vehicle 172. For example, the various aspects of the vehicle 172 may include a size of the vehicle 172, the weight of the vehicle 172, the number of occupants in the vehicle 172, and similar information associated with the vehicle tag 200 (e.g., stored on a database that is accessible by the tracking system 10).

As one example, the vehicle tag 200 may retro-reflect electromagnetic radiation in a way that signals to the control unit 18 that the guests in the vehicle 172 have purchased a particular type of ticket (e.g. a higher priced ticket for a parking space closer to the park attraction areas 146). In the embodiment of FIG. 16, the control unit 18 is configured to evaluate the retro-reflected electromagnetic radiation from the vehicle tag 200 and provide a recommendation based on different aspects associated with the tag 200. As illustrated, the control unit 18 may cause the display 230 to provide textual or graphical information 232 that the driver of the vehicle 172 may view in order to facilitate parking.

The recommendation provided by the control unit 18 may be based on additional information, which is not necessarily limited to just the vehicle tag 200. For instance, as shown, the control unit 18 may also be coupled to a parking monitoring system 234, which may be at least partially positioned within the open parking area 142 or the garage parking structure 144. The parking monitoring system 234 may also have an associated tracking system 10. Parking monitoring system 234 may monitor a number of spaces available for parking and provide this information to the control unit 18. Based on information relating to the vehicle 172 (e.g. based on information obtained from vehicle tag 200 or based on other types of information available from retro-reflection or associated data), the parking monitoring system 234 may compare the available spaces to the vehicle information to enable the control system 18 to provide a more appropriate recommendation. Here, the control unit 18 is causing the electronic display 230 to provide the recommended parking spot based on the vehicle's data.

As another example, the tracking system 10 may utilize the curved glass present on vehicles 172 to evaluate a size and/or shape thereof, and provide a recommendation based on that evaluation. For example, various glass-containing features of the vehicle 172, such as the vehicle's windshield 235, may be curved and undergo at least some amount of retro-reflection of the electromagnetic radiation beam 28 emitted by the emitter 14. The detector 16 may receive this retro-reflected electromagnetic radiation and may evaluate the nature of the retro-reflection to determine or otherwise estimate a size and/or shape of the vehicle 172. The tracking system 10 may, additionally or alternatively, utilize retro-reflection from the vehicle's headlights, tail lights, parking lights, fog lights, etc., which may, in some situations, have retro-reflective qualities. Indeed, the tracking system 10 may evaluate retro-reflection from any one or a combination of these features present on the vehicle 172 to evaluate the vehicle 172 and provide a parking recommendation.

Additionally or alternatively, there may be one or more grid patterns 236 of retro-reflective markers 24 positioned along the first and second entrance paths 218, 220. The tracking system 10 may monitor the reflection from the grid 236 and, based on changes in the reflection from the markers 24 (e.g., a change in the pattern of reflection), evaluate various aspects relating to the vehicle 172. For example the tracking system 10 may evaluate the size and shape of vehicle based on how much of the grid 236 the vehicle 172 covers (based on a change in reflection from the grid 236) to determine an appropriate (e.g., regular or compact) parking space for the vehicle 172.

Figure 17:
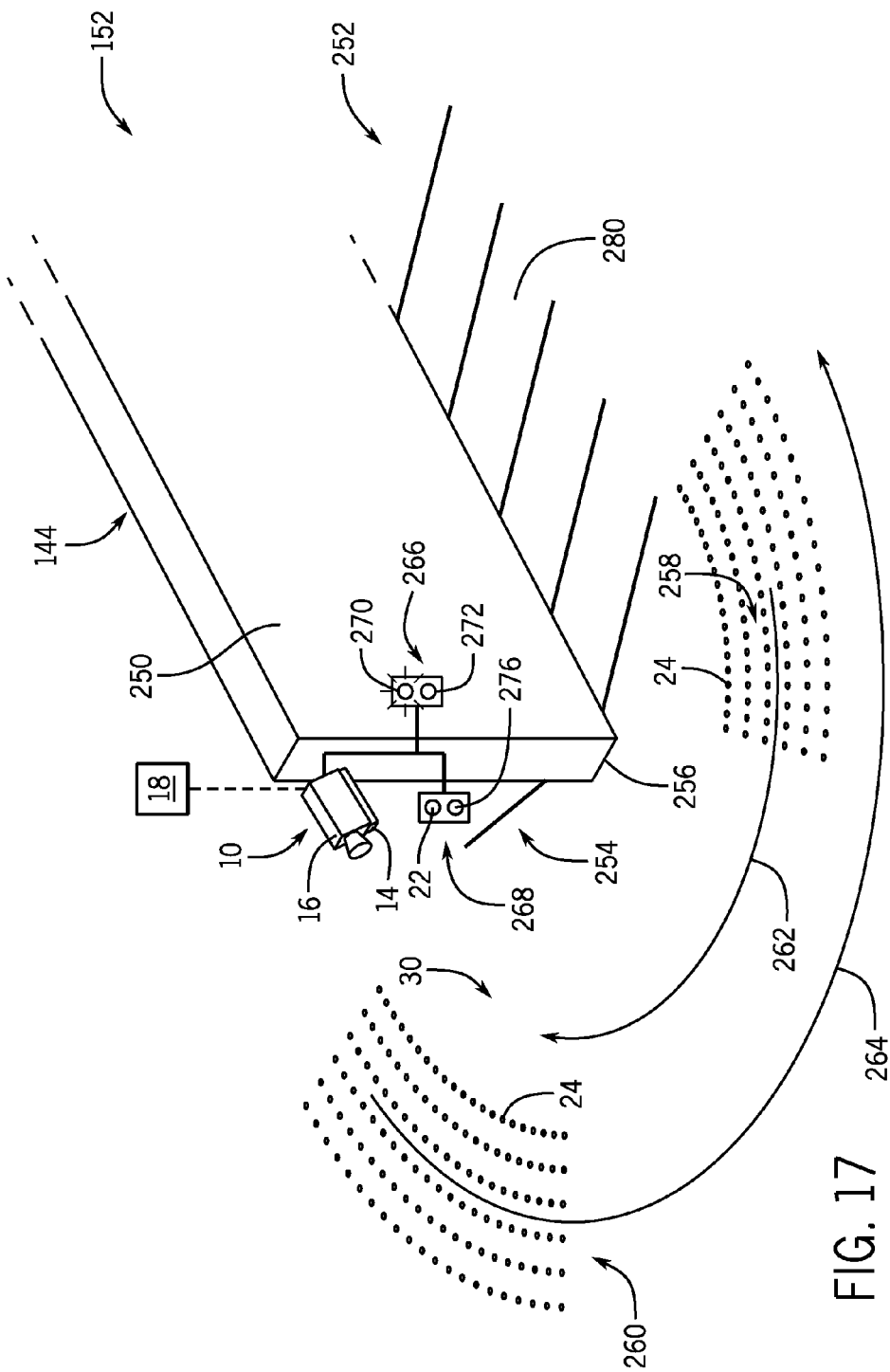
FIG. 17 is a perspective view of a garage traffic control system utilizing the tracking system to evaluate movement of vehicles through a garage parking structure and provide visual indications to drivers within the parking structure based on the evaluation, in accordance with an embodiment of the present disclosure.

Similar grids may also be positioned within the open parking area 142 and/or in the garage parking structure 144. Continuing with the travel of the guest through the amusement park area 138, in embodiments where the vehicle 172 travels into the second entrance path 220 and into the garage parking structure 144, the guest may encounter various embodiments of the tracking system 10 and the manner in which it is integrated with various features of the garage parking structure 144. One embodiment of such integration is depicted in FIG. 17, which is a perspective view of an embodiment of the garage traffic control system 152 including the disclosed tracking system 10 mounted to a wall 250 of the garage parking structure 144.

As illustrated, the wall 250 separates a first set of parking spaces 252 from a second set of parking spaces 254, which may be positioned (e.g., angled) in opposite directions to facilitate parking based on a direction of travel through the garage parking structure 144. As may be appreciated, when a number of vehicles 172 are traveling through a garage, there may be situations in which to vehicles 172 may attempt to round a corner 256 of the wall 250. The present embodiments include configurations in which the disclosed tracking system 10 is mounted on or proximate to the corner 256 to facilitate travel through the garage parking structure 144 and mitigate potential scrapes or other collisions between vehicles 172 or with garage structural features. In the particular implementation shown in FIG. 17, the tracking system 10 includes the emitter 14 and the detector 16 positioned on the corner 256 so that the emitter 14 illuminates a first set of retro-reflective markers 258 and a second set of markers 260.

The detector 16 is also positioned to receive retro-reflected electromagnetic radiation from the first set of retro-reflective markers 258 and second set of retro-reflective markers 260. The positioning of the first set of retro-reflective markers 258 is such that a first expected path of travel 262, which may be considered a first vehicle path 262, travels over the first set of markers 258. Accordingly, when the vehicle 172 travels along the path 262 it will cover at least some of the markers 24 associated with the first set of markers 258 thereby causing a change in the pattern of reflection produced by the first set 258. The tracking system 10 may determine an expected path of the vehicle 172 around the corner 256 based on the manner in which the vehicle 172 covers portions of the first set 258. The tracking system 10 may also perform a similar function with respect to the second set of retro-reflective markers 260, which are positioned along a second expected path of travel 264, which may be considered a second vehicle path 264. Based on monitoring patterns of reflection from the first set of markers 258 and/or the second set of markers 260, the control unit 18 associated with the tracking system 10 (or another control unit of an amusement park control system) may determine whether the actual vehicle paths determined by vehicles 172 traveling along first and second expected vehicle paths 262, 264 may need to be adjusted. Further, the sets 258, 260 of the retro-reflective markers 24 may have different optical qualities to facilitate differentiation between the sets 258, 260 by the tracking system 10. For example, the sets 258, 260 of the retro-reflective markers 24 may have different coatings that cause retro-reflection of different wavelengths of electromagnetic radiation back to the detector 16. Accordingly, in certain embodiments, the detector 16 may include one or more optical filters that include a bandwidth that encompasses each of the wavelengths separately, or a single bandwidth that encompasses both wavelengths. Such filters may enable the tracking system 10 to more easily recognize and evaluate retro-reflection specifically from the markers 24.

The control unit 18, as a result of performing such determinations, may provide one or more visual indications to vehicles 172 on the first and/or second vehicle paths 262, 264 to advise the guests in the vehicles 172 that there might be an oncoming vehicle to avoid. Indeed, the tracking system 10 may be configured to notify vehicles 172 of the presence of another vehicle 172 on an opposite side of the wall 250 based on any retro-reflective detection of their presence.

To provide such indications, the tracking system 10 may be communicatively coupled to perceivable indicators, such as a first set of advisory lights 266 and a second set of advisory lights 268. The first set of advisory lights 266 may include an associated first light 270 and second light 272, and the control unit 18 may cause the first light 270 or the second light 272 to selectively illuminate to provide a visual warning or similar indication to the vehicle 172 traveling along the first expected path of travel 262. Similarly, the control unit 18 may cause a third light 274 or a fourth light 276 of the second set of lights 268 to selectively illuminate to provide a warning or similar indication to the vehicle 172 traveling along the second expected path of travel 264.

The indications provided by the garage traffic control system 152 are not necessarily limited to colored lights or similar indications. Rather, in some embodiments, the garage traffic control system 152 may include various types of gates or similar physical blocking features that function to block movement of one vehicle 172 while another of the vehicles 172 passes by. Similarly, the garage traffic control system 152 may include other types of warning indications, such as audible indications or actual images of vehicles traveling through the garage parking structure 144. The garage traffic control system 152 may, in some embodiments, also be communicatively coupled to a workstation associated with a parking attendant booth or office, so that the parking attendant may be notified of any potential situation which may need be addressed (e.g., a stalled vehicle or item blocking a vehicle path).

Figure 18:
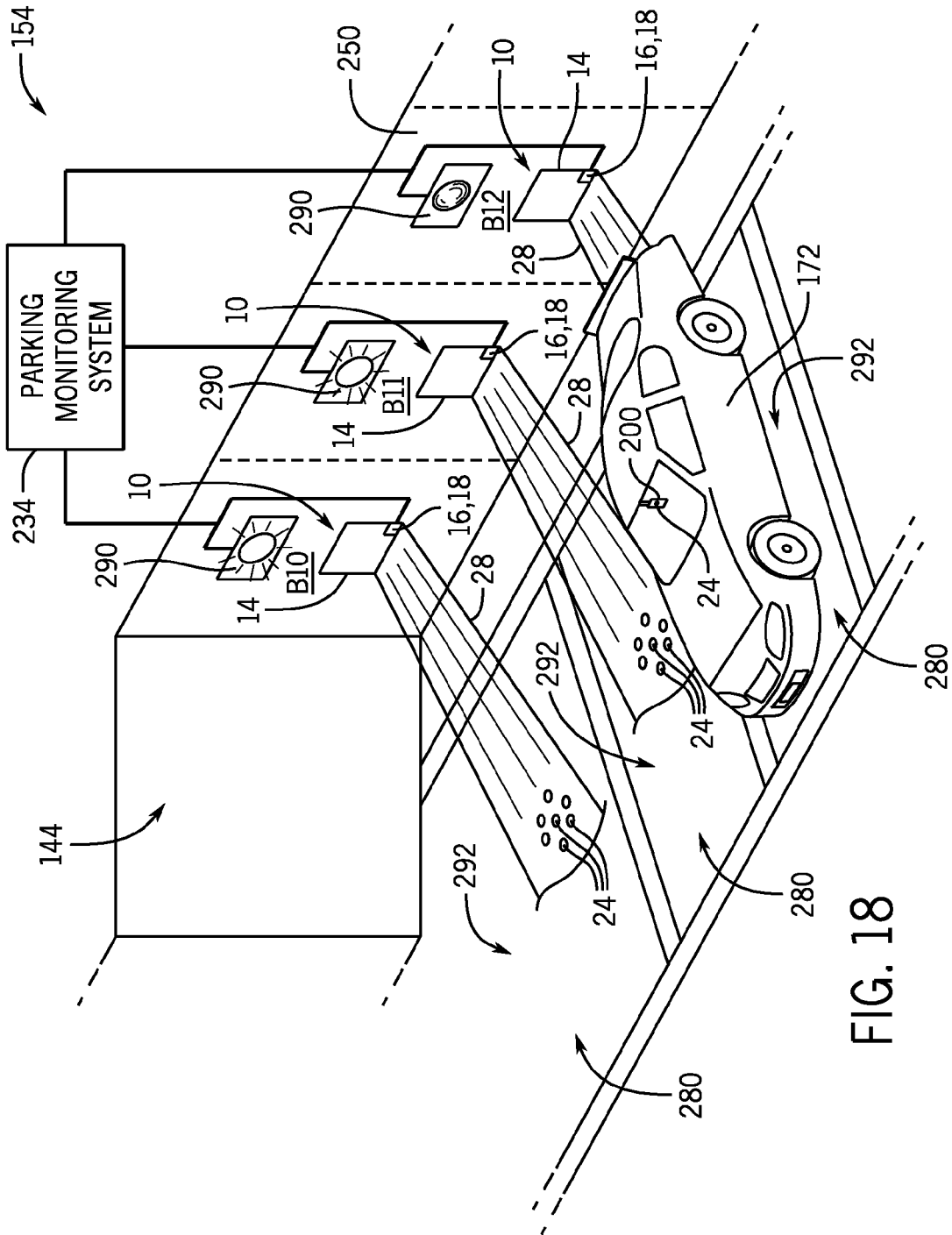
FIG. 18 is a perspective view of a vehicle assistance system utilizing a plurality of the tracking systems to evaluate whether certain parking spaces are occupied, and to assist drivers in parking their vehicles in the parking spaces, in accordance with an embodiment of the present disclosure.

Once the vehicle 172 has arrived proximate certain of the parking spaces 252, 254, the guest may begin to park the vehicle 172 and one of the parking spaces 280. As shown in FIG. 18, the disclosed tracking system 10 may, in addition to or as an alternative to the embodiments set forth above, be used to assist guests with parking their vehicle 172 in space 280. Specifically, FIG. 18 depicts an embodiment of the vehicle assistance system 154, which utilizes multiple tracking systems 10 to assist guests with their parking. However, it should be noted that a single disclosed tracking system 10 may be utilized in other embodiments to implement the vehicle assistance system 154 disclosed herein.

The tracking systems 10 in FIG. 18 may be configured to assist guests with parking and/or to provide parking space occupancy information to the parking monitoring system 234 mentioned above with respect to FIG. 16. In the illustrated garage parking structure 144, the disclosed tracking system 10 is used to increase the efficiency of parking lot/structure management. Specifically, the tracking system 10 may be configured to determine where the vehicles 172 are parked so that a visual indication of a vacant parking space may be provided to guests within the vehicle 172. For example, the visual indication may be provided by a light 290 mounted on or proximate to the wall 250 above each of the parking spaces 280. As illustrated, the control unit 18 may monitor retro-reflective markers 24 positioned on a floor 292 of the parking structure 144 and, upon detecting that a change in retro-reflection from markers 24 in one of the spaces, may cause the light 290 to illuminate when the parking space 280 is empty or de-illuminate when the parking space 280 is occupied. Such lights 290 may direct people entering the parking structure 144 to one of the open spaces 474 in less time than it would take for the person to park without this indication. Here, the lights 290 associated with spaces B10 and B11 are illuminated, notifying guests that the spaces are empty.

In addition, information relating to occupancy of the spaces 280 may be directed to the parking monitoring system 234, which may be associated with one or more centralized control systems of the amusement park area 138. Accordingly, the parking monitoring system 234 may include associated processing circuitry containing code or other stored instructions that cause the parking monitoring system to relay the occupancy information to the parking advisory system 150 and/or automated parking ticket kiosks, update or cause to be updated databases associated with parking ticket sales, and so forth.

In the illustrated embodiment, the parking spaces 280 are each equipped with their own tracking system 10 (e.g., emitter 12, detector 16, and control unit 18 configured to control the light 290). The tracking system 10 may be configured to detect the presence of the vehicle 172 in the corresponding space 280. In the illustrated embodiment, each parking space 280 has a group of retro-reflective markers 24 disposed on the parking space 280 in a location that would be occupied by a vehicle 172 parked in the space 280. Thus, the detector 16 may send signals representative of the presence (or absence) of electromagnetic radiation reflecting from the retro-reflective markers 24 to the control unit 18, which sends a control signal to the light 290 based on the signal from the detector 16. This control signal may change the state of the light 290 (e.g., from red to green, from off to on) when the retro-reflective markers 24 are uncovered and detectable after previously being covered. Thus, the tracking system 10 may indicate which parking spaces 280 are available at a given time in a way that allows a person relatively far away to identify and move to park in the open space 280. It should be noted that, while the illustrated vehicle 172 is a car, the tracking system 10 may detect the presence of other types of vehicles 172 as well. For example, the group of retro-reflective markers 24 may be arranged in a place where a car, motorcycle, or any other vehicle 172 may cover the retro-reflective markers 24 from the viewpoint of the detector 16. In addition, although the illustrated embodiment shows each parking space 280 having its own tracking system 10 (e.g., emitter 12, detector 16, etc.), it should be noted that in other embodiments, the parking structure 144 may include one tracking system 10 that detects and sends control signals to the lights 290 above multiple parking spaces 280 at a time.

Figure 19:
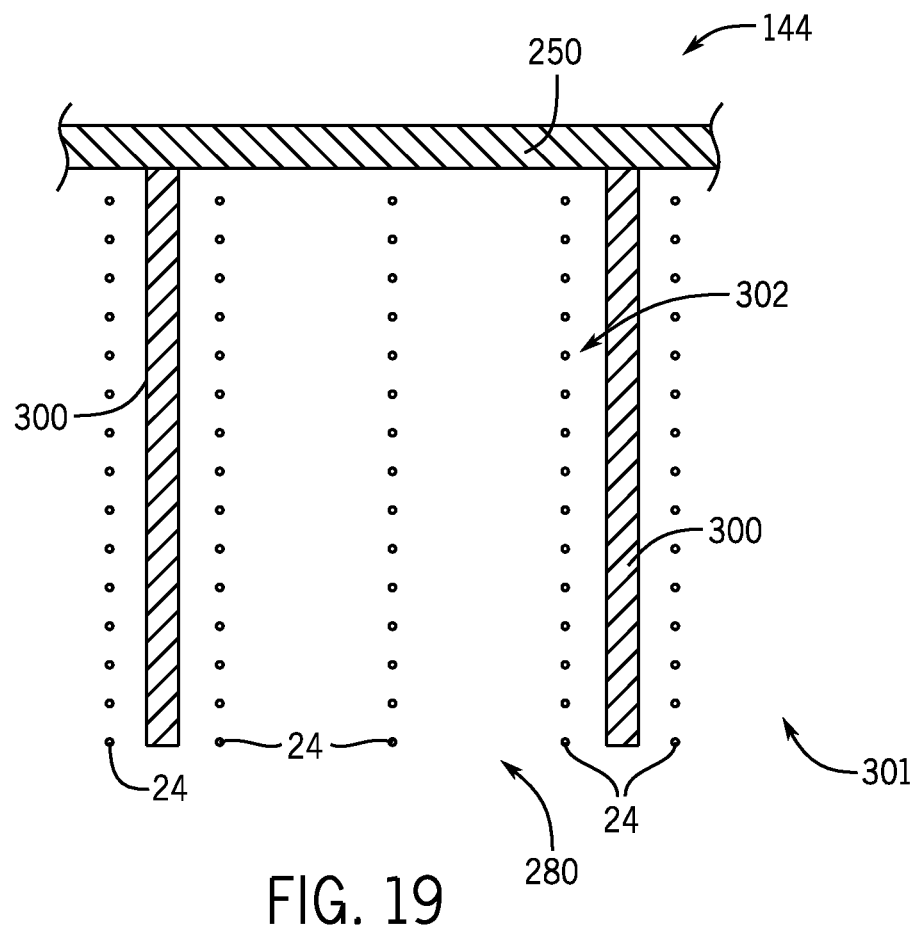
FIG. 19 is an overhead view of a parking space having retro-reflective markers positioned proximate separating lines of the parking space to enable the tracking system to evaluate a position of a vehicle within the space, in accordance with an embodiment of the present disclosure.

In accordance with certain embodiments of the present disclosure, the disclosed tracking system 150 may also be used to evaluate certain aspects relating to the manner in which vehicles 172 are positioned within the parking spaces 280. Referring now to FIG. 19, which is an overhead view of an embodiment of one of the parking spaces 280 within the garage parking structure 144, the markers 24 may be positioned at various locations relative to the spaces 280 to evaluate positioning of the vehicle 172 by the tracking system 10. The embodiment shown in FIG. 19 may be considered to be representative of the perspective of the emitter 14 and detector 16 and, accordingly, those elements are not shown for clarity.

In the illustrated embodiment, the markers 24 may be positioned at either side of separation lines 300. Generally, the separation lines 300 delineate boundaries of the parking spaces 280. In certain embodiments, the separation lines 300 may include a retro-reflective material. Accordingly, the tracking system 10 may be able to detect boundaries of the parking spaces 280 based on retro-reflected electromagnetic radiation. The markers 24 positioned on either side of the lines 300 may enable the control unit 18 to evaluate whether there is sufficient space to either side of the parking space 280 for another vehicle to park in an adjacent space 301, for example based on information about the vehicle 172 that might park in the adjacent space 301. As an example, if a vehicle within the space 280 were to cover some or all of a set 302 of markers positioned on the inside of one of the lines 300, the vehicle 172 within the space 280 may then be considered to be relatively close to the line 300. However, the vehicle 172 may be considered to be appropriately parked within the space 280 if the first set of markers 302 is covered (or portion thereof is covered), but none of the line 300 is covered. On the other hand, if the tracking system 10 were to receive retro-reflected electromagnetic radiation such that the control unit 18 determines that a change in the retro reflected electromagnetic radiation pattern from the line 300 is partially or fully blocked, then the parking advisory system 150 may only recommend for smaller vehicles 172 to park in the adjacent space 301. A signal (e.g., light above the parking space 280) may be utilized to indicate improperly parked vehicles 172.

The illustrated parking space 280 does not necessarily need to include retro-reflective materials for the lines 300. Rather, in certain embodiments, the first set of markers 302 may be positioned sufficiently close to the line 300 so that any coverage of any of the markers 24 of the set 302 would indicate that the vehicle 172 in the space 280 is too close to the line 300. As a result of such a determination, the control unit 18 of the tracking system 10, or other feature in communication with the control unit 18, may provide an indication (e.g., an illuminated light as shown in FIG. 18) to the person parking the vehicle 172 within space 280 that they should adjust the position of their vehicle 172, or that their vehicle might not be appropriately sized for the space 280. Again, based on coverage of the markers 24, the tracking system 10 may provide input to the parking advisory system 150 to enable parking recommendations to be provided as appropriate.

In certain embodiments, the amusement park area 138 may include embodiments of the vehicle assistance system 154 within the garage parking structure 144 and/or the open parking area 142 that enables guests to be assisted when experiencing problems with their vehicles 172. Such an embodiment of the system 154 is depicted in the perspective view illustrated in FIG. 20. Specifically, the perspective view of FIG. 20 depicts an embodiment of the garage parking structure 144 with multiple parking spaces 280 that are monitored by the disclosed tracking system 10. As shown, the emitter 14 of the tracking system 10 may flood a region of the parking structure 144 with certain wavelengths of electromagnetic radiation, which may be retro-reflected off of the vehicle tag 200 and/or retro-reflectively, diffusely, or specularly reflected off of elements of the vehicles 172. The control unit 18 may be configured to evaluate whether reflected electromagnetic radiation (e.g., retro-reflected light) from within the parking spaces 280 is indicative of whether one or more of the vehicles 172 is in need of assistance (e.g. maintenance, a jumpstart, repairs).

In the illustrated embodiment, the tracking system 10 is configured to monitor the vehicle tag 200 and more specifically, one or more retro-reflective markers 24 on the vehicle tag 200. The vehicle tag 200 may include a normally reflecting first retro-reflective marker 24A. In accordance with one embodiment, the vehicle tag 200 may also include a second retro-reflective marker 24B, which would normally be covered by a removable opaque material 310 that prevents the second retro-reflective material 24B from receiving and/or reflecting electromagnetic radiation. For example, the vehicle tag 200 may include instructions for the guest that, when experiencing problems with their vehicle 172, they can remove the removable opaque material 310 and they will be assisted. Accordingly, should the tracking system 10 detect reflection from the second retro-reflective marker 24B, the tracking system 10 may take appropriate indication and/or control action.

To enable this detection, the first and second retro-reflective markers 24A, 24B may be configured to retro-reflect different wavelengths of electromagnetic radiation, or may have different optical qualities that are discernible by the tracking system 10. Accordingly, the tracking system 10 may be configured to identify when the second retro-reflective marker 24B begins to retro-reflect electromagnetic radiation from the emitter 14. In response to detecting this retro-reflection by the second marker 24B, the tracking system 10 may provide an indication to a workstation 312 associated with an office or booth of a garage attendant to notify the attendant that one or more vehicles 172 may be in need of assistance. For example such notification may be provided visually on a garage attendant display 314 or audibly using a series of beeps or some other audible indication, or a combination thereof.

Additionally or alternatively, the first and second retro-reflective markers 24A, 24B may be configured in substantially the same way. That is, the first and second retro-reflective markers 24A, 24B may be configured to retro-reflect electromagnetic radiation in substantially the same manner and substantially the same wavelengths (e.g., within a tolerance defined by filters of the detector 16 or the control unit 18, or both). In such embodiments, the tracking system 10 may be configured to determine the proximity of one retro-reflective marker 24 to another. Upon determining, with a certain degree of confidence, that two retro-reflective markers that are currently retro-reflecting are in a sufficient proximity to one another that they are likely located on the same vehicle tag 200, the tracking system 10 may initiate a communication to the workstation 312 to notify the parking attendant that the vehicle 172 is in need of assistance.

Further still, the vehicle assistance system 154 may not necessarily require the use of the vehicle tag 200 and associated retro-reflective markers 24. Rather, in addition to or as an alternative to the vehicle tag 200, the tracking system 10 may be configured to detect certain types of reflection indicative of vehicle problems, such as a raised vehicle hood 316. For example, portions of the vehicle hood 316 may reflect the emitted light 28 from the emitter 14 in a characteristic way that is identifiable by the detector 16 and control unit 18. Accordingly, upon determining that a guest has raised a vehicle's hood, the tracking system 10 may initiate communication to the workstation 312 so that the guest can automatically be provided with assistance. Such detection may also be achieved by pattern detection based on an elevational configuration of the system 10, where the detector 16 may have an elevational view of the vehicle 172. For example, the detector 16 may detect the vehicle tag 200 and its associated marker 24 until the hood 316 is raised. The raised hood 316 may block the detector 16 from receiving the retro-reflected electromagnetic radiation from the retro-reflective marker 24 (e.g., due to the marker 24 being blocked from receiving the electromagnetic radiation beam 28 by the raised hood 316).

After guests have entered into the amusement park area 138 via the private drive and controlled entrance 140 and parked their vehicle 172 (e.g., within open parking area 142 or garage parking structure 144), there may be relatively little action performed (where guest vehicles are concerned) beyond monitoring of the vehicles while parked. However, the disclosed tracking system 10 may also be used to control certain types of foot traffic and combinations of foot traffic and vehicular traffic within the amusement park attraction areas 146. An example of the manner in which the disclosed tracking system 10 may be utilized in the park attraction areas 146 as a part of the traffic control system 156 is shown in the overhead view depicted in FIG. 22.

Specifically, FIG. 22 illustrates an embodiment of a guest pathway 330, which connects a first attraction area 332A to a second attraction area 332B. The guest pathway 330 may be a pathway primarily handling foot traffic of guests as they walk between various attractions within the amusement park. However, certain smaller vehicles, such as carts or similar conveyances, may also travel along the guest pathway 330. The illustrated guest path 330 is crossed by a service path 334, which may connect a first servicing area 336A with a second servicing area 336B. The first and second servicing areas 336A, 336B may be servicing areas associated with the attraction areas 332 or other features of the amusement park. It may be appreciated that the servicing areas 336 may not necessarily be viewable by guests from the perspectives available along the guest path 330 and indeed, may be hidden.

For example, as shown in the illustrated embodiment of FIG. 22, various environmental features 338 may be positioned in different locations about the pathway 330, thereby blocking view of the servicing areas 336. The environmental features 338 may include, by way of example, physical features which may or may not have entertainment functionality, such as booths for certain types of games, shows, restaurants, storefronts, restrooms, and so forth. Accordingly, it should be appreciated that in certain situations, guests may not necessarily be able to readily see vehicle traffic traveling along the service path 334, such as a service vehicle or cart 340.

In accordance with present embodiments, the tracking system 10 may be configured to monitor the intersection of the guest path 330 and service path 334 and to control the flow of foot traffic and/or service traffic based on this monitoring. As shown, the tracking systems 10 may be positioned in a variety of locations that enable monitoring sufficient to control access by the service vehicle 340 to different sections of the service path 334. As illustrated, a first embodiment of the tracking system, marked as tracking system 10A, may be fixed to environmental features 338 of the park. For example, the first embodiment of the tracking system 10A may be fixed to a building or other similar structure of the environmental features 338. Additionally or alternatively, a second embodiment of the tracking system, marked as tracking system 10B, may be a standalone unit appropriately positioned to monitor retro-reflection from either or both of the paths 330, 334.

As shown, the tracking systems 10 may be communicatively coupled (e.g., directly or indirectly) to gate actuating devices 342 that control the movement of movable gates 344 positioned along the path 334 at either side of the guest path 330. As an example of the manner in which the tracking system 10 in FIG. 22 may operate to control the flow of traffic in the park, the tracking system 10 may monitor retro-reflection along either or both of the pathways 330, 334, which may be retro-reflection from fixed markers 24 disposed (e.g., as grids 345) on the paths 330, 334, or may be moving retro-reflective markers 24 fitted to individuals 70 or other objects 32 (see FIGS. 1 and 7). Upon determining that a sufficient number of people 70 are located outside of a certain range of the service pathway 334, the tracking system 10 may initiate movement of the moving gates 344 so that the service vehicle 340 is able to progress along the path 334.

The tracking system 10 may have alternative or additional functionalities associated with the park traffic control system 156. For instance, the tracking systems 10 may be communicatively coupled to one or more displays 346 configured to provide visual indications to guests on the path 330 to instruct guests to remain in a certain area of the path 330 to allow a service vehicle 340 through, or simply as a warning that the service vehicle 340 will be passing by shortly. Alternative or additional indications may also be provided, such as audible indications, or indications by park employees upon receipt of automated instructions from the tracking system 10 (or other amusement park control system in communication with the tracking system 10).

While only certain features of the present embodiments have been illustrated and described herein, many modifications and changes will occur to those skilled in the art. It is, therefore, to be understood that the appended claims are intended to cover all such modifications and changes as fall within the true spirit of the invention.

The invention claimed is:

1. A vehicle traffic control system, comprising:
an emitter configured to emit electromagnetic radiation into a detection area;
a detector configured to detect retro-reflected electromagnetic radiation resulting from retro-reflection of the emitted electromagnetic radiation from retro-reflective markers within the detection area;
control circuitry communicatively coupled to the emitter and the detector, wherein the control circuitry is configured to monitor the retro-reflected electromagnetic radiation detected by the detector and evaluate information relating to one or more vehicles within a detection area based on the monitored retro-reflected electromagnetic radiation;
an automated device communicatively coupled to the control circuitry and configured to provide a user-perceivable indication relating to the one or more vehicles in the detection area, wherein the control circuitry is configured to cause the automated device to provide specific user-perceivable indications based on the evaluated information relating to the one or more vehicles;
a parking structure having a parking space, wherein the parking space comprises the retro-reflective markers positioned within an area corresponding to an expected location of a vehicle when the vehicle is parked within the parking space; and
wherein the parking space corresponds to at least a portion of the detection area, and the control circuitry is configured to determine whether the parking space is occupied by the vehicle based on retro-reflection by the retro-reflective markers.

2. The system of claim 1, wherein the detector comprises one or more optical filters configured to filter wavelengths of electromagnetic radiation that do not correspond to the electromagnetic radiation emitted by the emitter such that optical detection features of the detector receive substantially only those wavelengths of electromagnetic radiation that include the electromagnetic radiation emitted and retro-reflected to the detector.

3. The system of claim 1,
wherein the automated device comprises a light, a communication device, a sign, or any combination thereof, associated with the parking space, wherein the control circuitry is configured to trigger the light, the communication device, the sign, or the combination thereof, based on the occupancy of the parking space.

4. The system of claim 1, wherein the control circuitry is configured to:
correlate the retro-reflected electromagnetic radiation to the retro-reflective markers positioned within the area corresponding to the expected location;
monitor the retro-reflected electromagnetic radiation for changes in retro-reflection by the retro-reflective markers within the area corresponding to the expected location; and
associate changes in retro-reflection by the retro-reflective markers with a coverage of the markers by a vehicle parked within the parking space to determine whether the parking space is occupied.

5. A method of tracking and controlling the movement of vehicles, comprising:
flooding a detection area with electromagnetic radiation using an emitter, wherein the detection area corresponds to a portion of a parking structure;
detecting electromagnetic radiation that is retro-reflected from retro-reflective markers within the detection area using a detector, wherein a parking space of the parking structure comprises the retro-reflective markers positioned within an area corresponding to an expected location of a vehicle when the vehicle is parked within the parking space;
monitoring the retro-reflected electromagnetic radiation to evaluate whether the parking space is occupied by the vehicle using control circuitry communicatively coupled to at least the detector; and
controlling an automated device based, at least in part, on the occupancy of the parking space using the control circuitry to affect movement of the vehicle within the detection area.

6. The method of claim 5, wherein monitoring the retro-reflected electromagnetic radiation to evaluate information relating to one or more vehicles within the detection area comprises:

monitoring the retro-reflected electromagnetic radiation for changes indicative of retro-reflective markers no longer retro-reflecting the emitted electromagnetic radiation;

correlating the markers no longer retro-reflecting the emitted electromagnetic radiation to specific parking spaces within the parking structure to determine parking space occupation data; and wherein controlling the automated device based, at least in part, on the occupancy of the parking spot using the control circuitry to affect movement of the vehicle within the detection area comprises providing a user-perceivable parking space recommendation within the parking structure, or outside of the parking structure and along a pathway leading to the parking structure, using a display communicatively coupled to the control circuitry.

7. The method of claim 5, wherein the automated device comprises a light, a communication device, a sign, or any combination thereof, associated with the parking space, and wherein the control circuitry is configured to trigger the light, the communication device, the sign, or the combination thereof, based on the occupancy of the parking space.

* * * * *